(12) United States Patent
Huang et al.

(10) Patent No.: US 10,698,940 B2
(45) Date of Patent: Jun. 30, 2020

(54) METHOD FOR SEARCHING FOR MULTIMEDIA FILE, TERMINAL DEVICE, AND SERVER

(71) Applicant: Huawei Device Co., Ltd., Dongguan (CN)

(72) Inventors: Jiejing Huang, Shenzhen (CN); Chan Wang, Shenzhen (CN); Huangwei Wu, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 682 days.

(21) Appl. No.: 15/120,645

(22) PCT Filed: Jan. 31, 2015

(86) PCT No.: PCT/CN2015/072060
§ 371 (c)(1),
(2) Date: Aug. 22, 2016

(87) PCT Pub. No.: WO2015/124053
PCT Pub. Date: Aug. 27, 2015

(65) Prior Publication Data
US 2017/0011030 A1    Jan. 12, 2017

(30) Foreign Application Priority Data

Feb. 24, 2014  (CN) .......................... 2014 1 0063131

(51) Int. Cl.
*G06F 7/02*       (2006.01)
*G06F 16/00*      (2019.01)
(Continued)

(52) U.S. Cl.
CPC ............ *G06F 16/43* (2019.01); *G06F 16/951* (2019.01); *H04L 63/0428* (2013.01); *H04L 67/02* (2013.01); *H04L 67/10* (2013.01)

(58) Field of Classification Search
CPC ....... H04L 63/0428; H04L 9/14; H04L 67/06; H04L 67/10; H04L 67/02;
(Continued)

(56) References Cited

U.S. PATENT DOCUMENTS

| 2005/0108746 A1* | 5/2005 | Futagami | ............ H04L 65/4084 |
| | | | 725/31 |
| 2007/0005713 A1* | 1/2007 | LeVasseur | ............ H04L 63/126 |
| | | | 709/206 |

(Continued)

FOREIGN PATENT DOCUMENTS

| CN | 101106631 A | 1/2008 |
| CN | 101193074 A | 6/2008 |

(Continued)

*Primary Examiner* — Bruce M Moser
(74) *Attorney, Agent, or Firm* — Leydig, Voit & Mayer, Ltd.

(57) ABSTRACT

Embodiments of the present disclosure provide a method for searching for a multimedia file, a terminal device, and a server. The method for searching for a multimedia file includes: acquiring, from a server, encrypted summary information of a first multimedia file in at least one multimedia file, where encrypted summary information of the at least one multimedia file corresponds to encrypted content of the at least one multimedia file; decrypting, by a terminal device, the encrypted summary information of the first multimedia file, to obtain summary information of the first multimedia file; when determining that the summary information of the first multimedia file corresponds to a target multimedia file, acquiring, by the terminal device from the server, encrypted content of the first multimedia file corresponding to the summary information of the first multimedia file. According to the embodiments of the present disclosure, a target multimedia file can be quickly found.

16 Claims, 7 Drawing Sheets

(51) Int. Cl.
  *G06F 16/43* (2019.01)
  *G06F 16/951* (2019.01)
  *H04L 29/06* (2006.01)
  *H04L 29/08* (2006.01)

(58) Field of Classification Search
  CPC ......... G06F 17/30861; G06F 17/30023; G06F 17/30864; G06F 17/30017; G06F 16/95; G06F 16/43; G06F 16/951; G06F 16/10
  See application file for complete search history.

(56) References Cited

U.S. PATENT DOCUMENTS

| | | | | |
|---|---|---|---|---|
| 2011/0268178 | A1* | 11/2011 | Park | H04N 21/23439 375/240.02 |
| 2012/0331293 | A1* | 12/2012 | Ma | H04L 9/14 713/168 |
| 2013/0004138 | A1* | 1/2013 | Kilar | H04N 21/4756 386/230 |
| 2013/0285948 | A1 | 10/2013 | Zhang | |
| 2014/0122529 | A1* | 5/2014 | Frieder | G06F 17/2241 707/778 |
| 2014/0281583 | A1* | 9/2014 | Tupper | G06F 21/60 713/193 |
| 2015/0039882 | A1* | 2/2015 | Watanabe | H04L 63/0428 713/153 |
| 2015/0121063 | A1* | 4/2015 | Maller | H04L 63/0435 713/153 |

FOREIGN PATENT DOCUMENTS

| | | |
|---|---|---|
| CN | 102073624 A | 5/2011 |
| CN | 102157174 A | 8/2011 |
| CN | 102591980 A | 7/2012 |
| CN | 102611711 A | 7/2012 |
| CN | 102681847 A | 9/2012 |

* cited by examiner

100

```
┌─────────────────────────────────────────────────────────────────┐
│ A terminal device acquires, from a server, encrypted summary    │
│ information of a first multimedia file in at least one          │
│ multimedia file, where encrypted content of the at least one    │
│ multimedia file and encrypted summary information of the at     │~ 110
│ least one multimedia file are stored in the server, and the     │
│ encrypted summary information of the at least one multimedia    │
│ file corresponds to the encrypted content of the at least one   │
│ multimedia file                                                 │
└─────────────────────────────────────────────────────────────────┘
                                │
                                ▼
┌─────────────────────────────────────────────────────────────────┐
│ The terminal device decrypts the encrypted summary information  │
│ of the first multimedia file, to obtain summary information of  │~ 120
│ the first multimedia file                                       │
└─────────────────────────────────────────────────────────────────┘
                                │
                                ▼
┌─────────────────────────────────────────────────────────────────┐
│ When determining that the summary information of the first     │
│ multimedia file corresponds to a target multimedia file, the    │
│ terminal device acquires, from the server, encrypted content of │~ 130
│ the first multimedia file corresponding to the summary          │
│ information of the first multimedia file                        │
└─────────────────────────────────────────────────────────────────┘
```

```
┌─────────────────────────────────────────────────────────────────────┐
│ A server receives a first request message sent by a terminal device,│
│ where the first request message is used to request encrypted        │
│ summary information of a first multimedia file in at least one      │
│ multimedia file, where encrypted content of the at least one        │ ~ 210
│ multimedia file and encrypted summary information of the at least   │
│ one multimedia file are stored in the server, and the encrypted     │
│ summary information of the at least one multimedia file corresponds │
│ to the encrypted content of the at least one multimedia file        │
└─────────────────────────────────────────────────────────────────────┘
                                     │
                                     ▼
┌─────────────────────────────────────────────────────────────────────┐
│ The server sends the encrypted summary information of the first     │
│ multimedia file to the terminal device according to the first       │ ~ 220
│ request message                                                     │
└─────────────────────────────────────────────────────────────────────┘
                                     │
                                     ▼
┌─────────────────────────────────────────────────────────────────────┐
│ The server receives a second request message sent by the terminal   │
│ device, where the second request message is used to request         │
│ encrypted content of the first multimedia file corresponding to the │ ~ 230
│ encrypted summary information of the first multimedia file          │
└─────────────────────────────────────────────────────────────────────┘
                                     │
                                     ▼
┌─────────────────────────────────────────────────────────────────────┐
│ The server sends, to the terminal device according to the second    │
│ request message, the encrypted content of the first multimedia file │ ~ 240
│ corresponding to the encrypted summary information of the first     │
│ multimedia file                                                     │
└─────────────────────────────────────────────────────────────────────┘
```

FIG. 2

METHOD FOR SEARCHING FOR MULTIMEDIA FILE, TERMINAL DEVICE, AND SERVER

CROSS-REFERENCE TO RELATED APPLICATIONS

This application is a National Stage of International Application No. PCT/CN2015/072060, filed on Jan. 31, 2015, which claims priority to Chinese Patent Application No. 201410063131.4, filed on Feb. 24, 2014, both of which are hereby incorporated by reference in their entireties.

TECHNICAL FIELD

The present disclosure relates to the computer field, and in particular, to a method for searching for a multimedia file, a terminal device, and a server.

BACKGROUND

Cloud computing has been increasingly widely applied. More enterprises and individuals are willing to upload their data to a cloud server for storage, so as to save storage costs.

A security issue of data sharing or data backup of a cloud service is a big challenge. If, out of security consideration, cloud consumers (including enterprises and users) encrypt their data before uploading the data to a cloud server, the cloud server cannot read encrypted data of users, and in this way, security and privacy of user data are ensured. For example, before uploading a large quantity of multimedia files (including audios, videos, pictures, and the like) to a cloud server for backup, a user first encrypts the multimedia files locally (for example, on a user terminal).

However, when local multimedia files of the user are lost, and the user wants to retrieve some multimedia files backed up in the cloud server, because pictures backed up in the cloud server are encrypted, the user needs to locally download the large quantity of multimedia files stored in the cloud server and locally decrypt the encrypted backup multimedia files, and then view decrypted multimedia files one by one and determine which multimedia files are needed. In the method for searching for an encrypted multimedia file from a cloud server, a specific multimedia file cannot be quickly found in a large quantity of multimedia files.

SUMMARY

Therefore, embodiments of the present disclosure provide a method for searching for a multimedia file, a terminal device, and a server, so that content of a target multimedia file can be quickly and conveniently found among encrypted multimedia files stored in a server.

According to a first aspect, a method for searching for a multimedia file is provided, where the method includes: acquiring, by a terminal device from a server, encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file; decrypting, by the terminal device, the encrypted summary information of the first multimedia file, to obtain summary information of the first multimedia file; and when determining that the summary information of the first multimedia file corresponds to a target multimedia file, acquiring, by the terminal device from the server, encrypted content of the first multimedia file corresponding to the summary information of the first multimedia file.

With reference to the first aspect, in a first possible implementation manner, the encrypted summary information of the first multimedia file is in a label of the first multimedia file, the label of the first multimedia file is a description about the first multimedia file, and before the acquiring, from a server, encrypted summary information of a first multimedia file, the method further includes: acquiring, by the terminal device, an address, in the server, of the label of the first multimedia file, and an address, in the server, of the encrypted content of the first multimedia file corresponding to the label of the first multimedia file, where the acquiring, by a terminal device from a server, encrypted summary information of a first multimedia file in at least one multimedia file includes: sending, by the terminal device, a first request message to the server, where the first request message carries the address, in the server, of the label of the first multimedia file and is used to request the label of the first multimedia file; receiving, by the terminal device, the label, sent by the server, of the first multimedia file; and acquiring, by the terminal device, the encrypted summary information of the first multimedia file from the label of the first multimedia file, where the acquiring, from the server, encrypted content of the first multimedia file corresponding to the summary information of the first multimedia file includes: sending, by the terminal device, a second request message to the server, where the second request message carries the address, in the server, of the encrypted content of the first multimedia file corresponding to the label of the first multimedia file, and is used to request the encrypted content of the first multimedia file; and receiving, by the terminal device, the encrypted content, sent by the server, of the first multimedia file.

With reference to the first possible implementation manner, in a second possible implementation manner, the address, in the server, of the label of the first multimedia file and the address, in the server, of the encrypted content of the first multimedia file are a same address or different addresses.

With reference to the first aspect, or the first or second possible implementation manner, in a third possible implementation manner, the method further includes: generating, by the terminal device according to content of a second multimedia file in the at least one multimedia file, summary information of the second multimedia file; encrypting, by the terminal device, the summary information of the second multimedia file by using a first key, to obtain encrypted summary information of the second multimedia file, and putting the encrypted summary information of the second multimedia file into a label of the second multimedia file; encrypting, by the terminal device, the content of the second multimedia file by using a second key, to obtain encrypted content of the second multimedia file; sending, by the terminal device, the label of the second multimedia file and the encrypted content of the second multimedia file to the server; and receiving, by the terminal device, an address, in the server, of the label of the second multimedia file and an address, in the server, of the encrypted content of the second multimedia file that are returned by the server.

With reference to the third possible implementation manner, in a fourth possible implementation manner, before the sending, by the terminal device, the label of the second multimedia file and the encrypted content of the second multimedia file to the server, the method further includes: receiving, by the terminal device, a personal digital certificate issued by a trusted third party (TTP); and encrypting, by the terminal device, the first key and the second key by using a public key corresponding to the personal digital certificate, and putting an encrypted first key and an encrypted second key into the label of the second multimedia file, where after receiving the label, sent by the server, of the second multimedia file, the terminal device decrypts, by using a private key corresponding to the public key, the encrypted first key and the encrypted second key that are in the label of the second multimedia file.

With reference to the first aspect, or the first or second possible implementation manner, in a fifth possible implementation manner, the method further includes: generating, by the terminal device according to content of a second multimedia file in the at least one multimedia file, summary information of the second multimedia file; putting, by the terminal device, the summary information of the second multimedia file into a label of the second multimedia file, and encrypting the label of the second multimedia file by using a first key; encrypting, by the terminal device, the content of the second multimedia file by using a second key, to obtain encrypted content of the second multimedia file; sending, by the terminal device, the label, which has been encrypted, of the second multimedia file and the encrypted content of the second multimedia file to the server; and receiving, by the terminal device, an address, in the server, of the label of the second multimedia file and an address, in the server, of the encrypted content of the second multimedia file that are returned by the server.

With reference to the third, fourth, or fifth possible implementation manner, in a sixth possible implementation manner, the address, in the server, of the label of the second multimedia file and the address, in the server, of the encrypted content of the second multimedia file are different addresses, where before the sending the label of the second multimedia file and the encrypted content of the second multimedia file to the server, the method further includes: separating, by the terminal device, the label of the second multimedia file and the encrypted content of the second multimedia file; and recording, by the terminal device, a correspondence between the label of the second multimedia file and the encrypted content of the second multimedia file.

According to a second aspect, a method for searching for a multimedia file is provided, where the method includes: receiving, by a server, a first request message sent by a terminal device, where the first request message is used to request encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file; sending, by the server, the encrypted summary information of the first multimedia file to the terminal device according to the first request message; receiving, by the server, a second request message sent by the terminal device, where the second request message is used to request encrypted content of the first multimedia file corresponding to the encrypted summary information of the first multimedia file; and sending, by the server to the terminal device according to the second request message, the encrypted content of the first multimedia file corresponding to the encrypted summary information of the first multimedia file.

With reference to the second aspect, in a first possible implementation manner of the second aspect, the encrypted summary information of the first multimedia file is in a label of the first multimedia file, the label of the first multimedia file is a description about the first multimedia file, the first request message carries an address of the label of the first multimedia file and is used to request the label of the first multimedia file, and the sending, by the server, the encrypted summary information of the first multimedia file to the terminal device according to the first request message includes: sending, by the server, the label of the first multimedia file to the terminal device, where the second request message carries an address of the encrypted content of the first multimedia file, where the encrypted content of the first multimedia file corresponds to the label of the first multimedia file.

With reference to the second aspect, in a second possible implementation manner of the second aspect, the encrypted summary information of the first multimedia file is in a label of the first multimedia file, the label of the first multimedia file is a description about the first multimedia file, the first request message carries an address of the label of the first multimedia file and is used to request the label of the first multimedia file, and after the receiving, by a server, a first request message sent by a terminal device, the method further includes: separating, by the server, the label of the first multimedia file and the encrypted content of the first multimedia file according to the first request message; and recording, by the server, a correspondence between the label of the first multimedia file and the encrypted content of the first multimedia file, where the sending, by the server, the encrypted summary information of the first multimedia file to the terminal device includes: sending, by the server, the label of the first multimedia file to the terminal device, where the second request message carries the address of the label of the first multimedia file; and after the receiving, by the server, a second request message sent by the terminal device, the method according to the second aspect further includes: determining, by the server according to the second request message and the correspondence, the encrypted content of the first multimedia file corresponding to the label of the first multimedia file.

According to a third aspect, a terminal device is provided, where the terminal device includes: an acquiring module, configured to acquire, from a server, encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file; and a decryption module, configured to decrypt the encrypted summary information of the first multimedia file, to obtain summary information of the first multimedia file, where the acquiring module is further configured to: when it is determined that the summary information of the first multimedia file corresponds to a target multimedia file, acquire, from the server, encrypted content of the first multimedia file corresponding to the summary information of the first multimedia file.

With reference to the third aspect, in a first possible implementation manner of the third aspect, the encrypted summary information of the first multimedia file is in a label of the first multimedia file, the label of the first multimedia file is a description about a multimedia file of the first multimedia file, and the acquiring module is further configured to: before acquiring, from the server, the encrypted summary information of the first multimedia file in the at least one multimedia file, acquire an address, in the server, of the label of the first multimedia file and an address, in the server, of the encrypted content of the first multimedia file corresponding to the label of the first multimedia file, where the acquiring module is specifically configured to: send a first request message to the server, where the first request message carries the address, in the server, of the label of the first multimedia file and is used to request the label of the first multimedia file; receive the label, sent by the server, of the first multimedia file; acquire the encrypted summary information of the first multimedia file according to the label of the first multimedia file; send a second request message to the server, where the second request message carries the address, in the server, of the encrypted content of the first multimedia file corresponding to the label of the first multimedia file, and is used to request the encrypted content of the first multimedia file; and receive the encrypted content, sent by the server, of the first multimedia file.

With reference to the first possible implementation manner of the third aspect, in a second possible implementation manner of the third aspect, the address, in the server, of the label of the first multimedia file and the address, in the server, of the encrypted content of the first multimedia file are a same address or different addresses.

With reference to the third aspect, or the first or second possible implementation manner of the third aspect, in a third possible implementation manner of the third aspect, the terminal device according to the third aspect further includes: a generation module, configured to generate, according to content of a second multimedia file in the at least one multimedia file, summary information of the second multimedia file; an encryption module, configured to encrypt the summary information of the second multimedia file by using a first key, to obtain encrypted summary information of the second multimedia file, and put the encrypted summary information of the second multimedia file into a label of the second multimedia file; and further configured to encrypt content of the second multimedia file by using a second key, to obtain encrypted content of the second multimedia file; a sending module, configured to send the label of the second multimedia file and the encrypted content of the second multimedia file to the server; and a receiving module, configured to receive an address, in the server, of the label of the second multimedia file and an address, in the server, of the encrypted content of the second multimedia file that are returned by the server.

With reference to the third possible implementation manner of the third aspect, in a fourth possible implementation manner of the third aspect, the receiving module is further configured to: before the sending module sends the label of the second multimedia file and the encrypted content of the second multimedia file to the server, receive a personal digital certificate issued by a trusted third party TTP, where the encryption module is further configured to encrypt the first key and the second key by using a public key corresponding to the personal digital certificate, and put an encrypted first key and an encrypted second key into the label of the second multimedia file; and the decryption module is further configured to: after the receiving module receives the label, sent by the server, of the second multimedia file, decrypt, by using a private key corresponding to the public key, the encrypted first key and the encrypted second key that are in the label of the second multimedia file.

With reference to the third aspect, or the first or second possible implementation manner of the third aspect, in a fifth possible implementation manner of the third aspect, the terminal device further includes: a generation module, configured to generate, according to content of a second multimedia file in the at least one multimedia file, summary information of the second multimedia file; an encryption module, configured to put the summary information of the second multimedia file into a label of the second multimedia file and encrypt the label of the second multimedia file by using a first key; and further configured to encrypt content of the second multimedia file by using a second key, to obtain encrypted content of the second multimedia file; a sending module, configured to send the label, which has been encrypted, of the second multimedia file and the encrypted content of the second multimedia file to the server; and a receiving module, configured to receive an address, in the server, of the label of the second multimedia file and an address, in the server, of the encrypted content of the second multimedia file that are returned by the server.

With reference to any possible implementation manner of the third to fifth possible implementation manners of the third aspect, in a sixth possible implementation manner of the third aspect, the address, in the server, of the label of the second multimedia file and the address, in the server, of the encrypted content of the second multimedia file are different addresses, and the terminal device further includes: a separation module, configured to separate the label of the second multimedia file and the encrypted content of the second multimedia file before the terminal device sends the label of the second multimedia file and the encrypted content of the second multimedia file to the server; and a recording module, configured to record a correspondence between the label of the second multimedia file and the encrypted content of the second multimedia file.

According to a fourth aspect, a server is provided, where the server includes: a receiving module, configured to receive a first request message sent by a terminal device, where the first request message is used to request encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file; and a sending module, configured to send the encrypted summary information of the first multimedia file to the terminal device according to the first request message, where the receiving module is further configured to receive a second request message sent by the terminal device, where the second request message is used to request encrypted content of the first multimedia file corresponding to the encrypted summary information of the first multimedia file; and the sending module is further configured to send, to the terminal device according to the second request message, the encrypted content of the first multimedia file corresponding to the encrypted summary information of the first multimedia file.

With reference to the fourth aspect, in a first possible implementation manner of the fourth aspect, the encrypted summary information of the first multimedia file is in a label of the first multimedia file, the label of the first multimedia file is a description about the first multimedia file, the first request message carries an address of the label of the first multimedia file and is used to request the label of the first multimedia file, and the sending module is specifically configured to send the label of the first multimedia file to the terminal device, where the second request message carries an address of the encrypted content of the first multimedia file, where the encrypted content of the first multimedia file corresponds to the label of the first multimedia file.

With reference to the fourth aspect, in a second possible implementation manner of the fourth aspect, the encrypted summary information of the first multimedia file is in a label of the first multimedia file, the label of the first multimedia file is a description about the first multimedia file, the first request message carries an address of the label of the first multimedia file and is used to request the label of the first multimedia file, and the server further includes: a separation module, configured to separate the label of the first multimedia file and the encrypted content of the first multimedia file according to the first request message; and a recording module, configured to record a correspondence between the label of the first multimedia file and the encrypted content of the first multimedia file, where the sending module is specifically configured to send the label of the first multimedia file to the terminal device, where the second request message carries the address of the label of the first multimedia file; and the server according to the fourth aspect further includes: a determining module, configured to determine, according to the second request message and the correspondence, the encrypted content of the first multimedia file corresponding to the label of the first multimedia file.

According to a fifth aspect, a method for generating a label of a multimedia file is provided, where the method includes: generating a label of a multimedia file; generating summary information of the multimedia file according to content of the multimedia file, where the summary information is thumbnail content of the multimedia file; and adding the summary information of the multimedia file to the label of the multimedia file.

According to a sixth aspect, an apparatus for generating a label of a multimedia file is provided, where the apparatus includes: a generating module, configured to generate a label of a multimedia file, and generate summary information of the multimedia file according to content of the multimedia file, where the summary information is thumbnail content of the multimedia file; and an adding module, configured to add the summary information of the multimedia file to the label of the multimedia file.

In this technical solution, encrypted summary information of an encrypted multimedia file is acquired from a server and decrypted, and when summary information obtained after the decryption corresponds to a target multimedia file to be searched for, encrypted content corresponding to the summary information is acquired from the server, so that in a case in which a multimedia file is encrypted, the encrypted multimedia file can be quickly and conveniently found by searching encrypted summary information.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 1 is a schematic flowchart of a method for searching for a multimedia file according to an embodiment of the present disclosure;

FIG. 2 is a schematic flowchart of a method for searching for a multimedia file according to another embodiment of the present disclosure;

DESCRIPTION OF EMBODIMENTS

Figure 3:
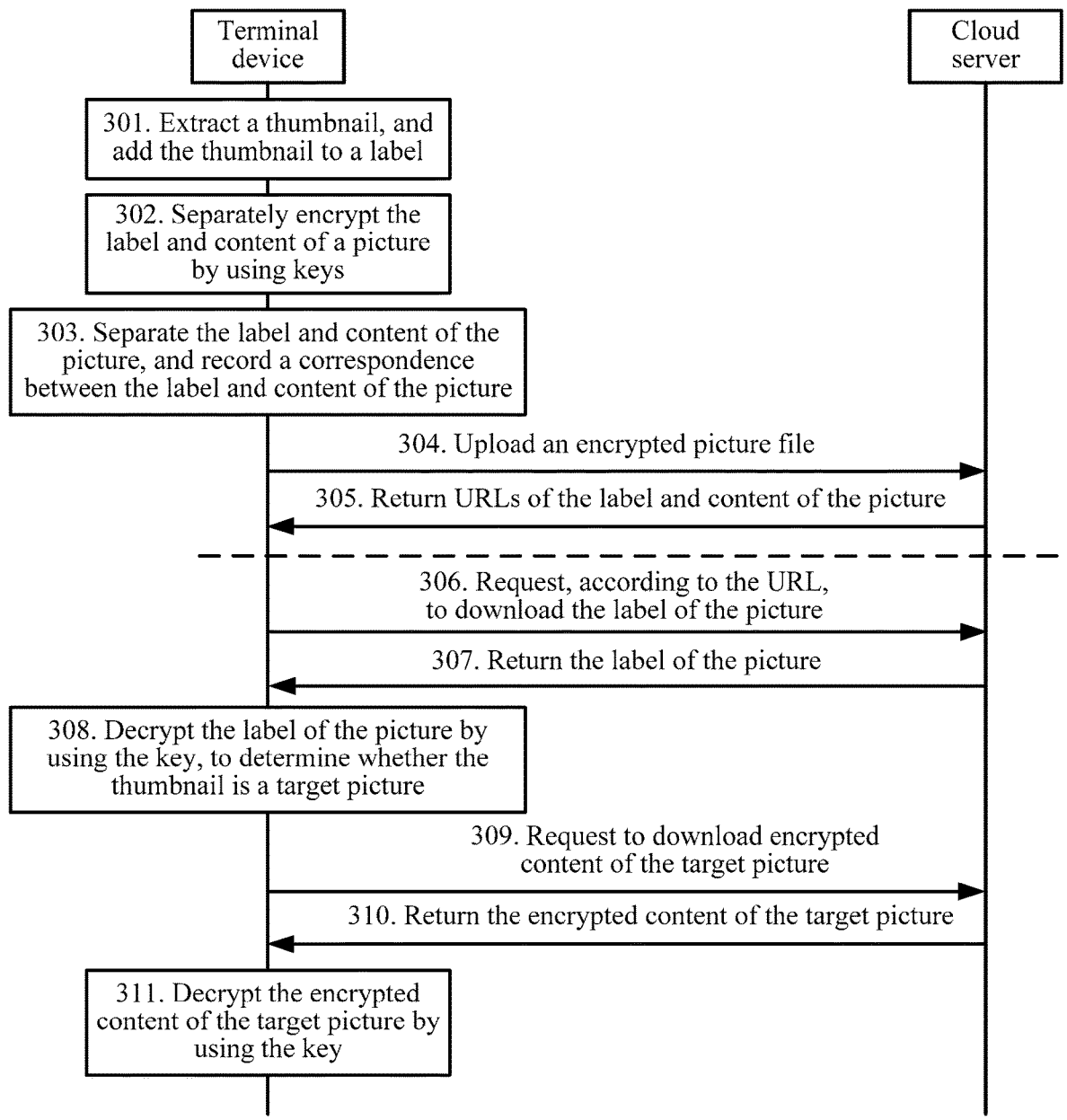
FIG. 3 is a schematic flowchart of a method for searching for a multimedia file according to still another embodiment of the present disclosure.

The following clearly and completely describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

FIG. 1 shows a schematic flowchart of a method 100 for searching for a multimedia file according to an embodiment of the present disclosure. The method 100 may be executed by a terminal device of a user. As shown in FIG. 1, the method 100 includes the following content.

110: The terminal device acquires, from a server, encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file.

For example, content of each multimedia file in the at least one multimedia file and summary information of the multimedia file are separately encrypted. Encrypted content and encrypted summary information of each multimedia file stored in the server correspond to each other, and according to encrypted summary information of a multimedia file, encrypted content of the multimedia file can be determined.

120: The terminal device decrypts the encrypted summary information of the first multimedia file, to obtain summary information of the first multimedia file.

130: When determining that the summary information of the first multimedia file corresponds to a target multimedia file, the terminal device acquires, from the server, encrypted content of the first multimedia file corresponding to the summary information of the first multimedia file.

For example, a user may view the summary information to determine whether the summary information corresponds to a target multimedia file wanted by the user, that is, determine whether a multimedia file corresponding to the summary information is a target multimedia file wanted by the user; or may set a search condition in the terminal device in advance, to determine whether the summary information satisfies the search condition, that is, whether the summary information corresponds to a target multimedia file to be searched for.

The first multimedia file is any multimedia file in the at least one multimedia file stored in the server. When searching for a multimedia file in the server, the terminal device may perform the foregoing process on any multimedia file in the at least one multimedia file stored in the server. For example, during a search process, the terminal device may select, according to an instruction entered by the user or a preset instruction inside the terminal device, encrypted summary information of one or more multimedia files in the at least one multimedia file stored in the server, and then acquire the encrypted summary information of the one or more multimedia files from the server one by one. Correspondingly, from the encrypted summary information of the one or more multimedia files, one target multimedia file to be searched for may be determined, or multiple target multimedia files to be searched for may be determined.

Specifically, the server may be a cloud server, may be a server on the Internet, or may be another server that stores data by using a network, for example, a web disk, which is not limited in the present disclosure. The multimedia file may be a picture, a video, an audio, or the like. The multimedia file includes at least the following two parts: a label of the multimedia file, and content of the multimedia file. The label of the multimedia file is a description about information of the multimedia file. For example: for a photograph, the label of the multimedia file includes: a date when the photograph is shot, photograph pixels, and the like, and the content of the multimedia file is the photograph. In this embodiment of the present disclosure, the summary information of the multimedia file may be simplified information that is extracted from the content of the multimedia file and that can reflect the content of the multimedia file. In other words, the user may determine content of a multimedia file according to summary information of the multimedia file. For example: for a picture, the summary information may be a thumbnail of the picture; for a video, the summary information may be one or several frames of static pictures or a video clip; and for an audio, the summary information may be a climax part or a representative part of the audio, but the present disclosure is not limited thereto.

According to this embodiment of the present disclosure, when a specific multimedia file is searched for in encrypted multimedia files that are backed up in a cloud server, it is unnecessary to download the encrypted multimedia files locally (for example, to a terminal device of a user); the user only needs to locally download encrypted summary information corresponding to the encrypted multimedia files, decrypt the encrypted summary information locally, then determine which pieces of summary information correspond to multimedia files to be searched for, and then download the corresponding multimedia files. However, in the prior art, the user needs to locally download backup multimedia files in the cloud server first, decrypt the encrypted backup files locally, and then view photographs obtained by means of decryption to determine which photographs are needed. Downloading encrypted summary information saves traffic compared with downloading encrypted multimedia files, and besides, costs of decrypting summary information are much less than costs of decrypting multimedia files; therefore, in the method for searching for a multimedia file according to this embodiment of the present disclosure, an encrypted multimedia file in a server can be quickly and conveniently found.

Therefore, in the method for searching for a multimedia file according to this embodiment of the present disclosure, encrypted summary information of a multimedia file is acquired from a server and decrypted, and when summary information obtained after the decryption corresponds to a target multimedia file to be searched for, encrypted content corresponding to the summary information is acquired from the server, so that in a case in which a multimedia file is encrypted, the encrypted multimedia file can be quickly and conveniently found by searching encrypted summary information.

Specifically, before the encrypted summary information of the multimedia file is acquired from the server, the method 100 further includes: establishing a connection to the server. For example, when the user wants to search for some multimedia files, the user may use a terminal device thereof to log onto the server by using a network, so that the terminal device establishes a connection to the server.

Optionally, as another embodiment, the encrypted summary information of the first multimedia file is in a label of the first multimedia file, the label of the first multimedia file is a description about the first multimedia file, and before the acquiring, by a terminal device from a server, encrypted summary information of a first multimedia file, the method 100 further includes: acquiring an address, in the server, of the label of the first multimedia file and an address, in the server, of the encrypted content of the first multimedia file corresponding to the label of the first multimedia file.

Specifically, the address information may be in a form of a URL (universal resource locator), and this embodiment of the present disclosure is not limited thereto, for example, the address information may also be in a form of a file directory, or in another form for representing an address.

In 110, the terminal device sends a first request message to the server, where the first request message carries the address, in the server, of the label of the first multimedia file and is used to request the label of the first multimedia file; the terminal device receives the label, sent by the server, of the first multimedia file; and the terminal device acquires the encrypted summary information of the first multimedia file from the label of the first multimedia file.

In 130, the terminal device sends a second request message to the server, where the second request message carries the address, in the server, of the encrypted content of the first multimedia file corresponding to the label of the first multimedia file, and is used to request the encrypted content of the first multimedia file; and the terminal device receives the encrypted content, sent by the server, of the first multimedia file.

In other words, in this embodiment of the present disclosure, the summary information of the multimedia file is stored in a manner of being put in the label of the multimedia file. Specifically, when the user searches encrypted summary information of multimedia files by using the terminal device so as to find and download some specific multimedia files in the cloud server, the user may first download, from the cloud server, labels, including the summary information, of the multimedia files, and then determine, according to the summary information in the labels, whether to download corresponding multimedia files from the server.

Specifically, in this embodiment of the present disclosure, the address, in the server, of the label of the first multimedia file and the address, in the server, of the encrypted content of the first multimedia file are a same address or different addresses.

Optionally, as another embodiment, the method 100 for searching for a multimedia file according to this embodiment of the present disclosure further includes: generating, by the terminal device according to content of a second multimedia file in the at least one multimedia file, summary information of the second multimedia file; encrypting, by the terminal device, the summary information of the second multimedia file by using a first key, to obtain encrypted summary information of the second multimedia file, and putting the encrypted summary information of the second multimedia file into a label of the second multimedia file; encrypting, by the terminal device, the content of the second multimedia file by using a second key, to obtain encrypted content of the second multimedia file; sending, by the terminal device, the label of the second multimedia file and the encrypted content of the second multimedia file to the server; and receiving, by the terminal device, an address, in the server, of the label of the second multimedia file and an address, in the server, of the encrypted content of the second multimedia file that are returned by the server.

The second multimedia file and the first multimedia file may be a same multimedia file, or may be different multimedia files. In other words, before uploading a multimedia file to the server, the terminal device may process the multimedia file according to the foregoing method.

The first key and the second key may be a same key or may be different keys. When summary information are encrypted, a symmetric encryption manner or in an asymmetric encryption manner may be used.

After the summary information of the multimedia file is encrypted, the encrypted summary information is put into the label of the multimedia file for storage. Because information in the label of the multimedia file does not concern privacy of the user, the label of the multimedia file may not be encrypted, which is not limited in this embodiment of the present disclosure.

Optionally, as another embodiment, before the sending, by the terminal device, the label of the second multimedia file and the encrypted content of the second multimedia file to the server, the method 100 further includes: receiving, by the terminal device, a personal digital certificate issued by a trusted third party TTP; and encrypting, by the terminal device, the first key and the second key by using a public key corresponding to the personal digital certificate, and putting an encrypted first key and an encrypted second key into the label of the second multimedia file, where after receiving the label, sent by the server, of the second multimedia file, the terminal device decrypts, by using a private key corresponding to the public key, the encrypted first key and the encrypted second key that are in the label of the second multimedia file.

Specifically, the trusted third party (TTP) is a trusted third-party authority between the cloud server and cloud consumers. A cloud consumer may not trust the cloud server, but the cloud consumer trusts this TTP. The TTP may serve as a combination of a certification authority (CA) and a key distribution center (KDC), and takes the responsibility of providing a personal digital certificate for a cloud consumer in advance. A distribution process of the certificate is considered to be secure by default, because by means of existing technologies (for example, Secure Sockets Layer (SSL), Transport Layer Security (TLS), and Internet Protocol Security (IPSec)), it can be absolutely ensured that an interaction process between the TTP and the cloud consumer is secure.

Optionally, as another embodiment, for each multimedia file, the first key and the second key may be put into the label first, and then the label is encrypted by using the public key of the personal digital certificate, and in this way, an effect of encrypting the first key and the second key can also be achieved, which is not limited in this embodiment of the present disclosure.

In the method for searching for a multimedia file in this embodiment of the present disclosure, a target multimedia file can be quickly and conveniently found by searching summary information of encrypted multimedia files, and moreover, problems of insecurity and inconvenience due to that a user stores keys locally can also be avoided. The reason lies in that a key for encrypting summary information of a multimedia file and content of the multimedia file is put in a label of the multimedia file after being encrypted by using a public key of a personal digital certificate, and when a terminal device of a user is lost or damaged, the user can still request the TTP to return the original personal digital certificate after the user uses a new terminal device. The terminal device of the user can still perform decryption by using a private key of the original personal digital certificate, to obtain the key, and therefore, it is more secure and convenient to access the multimedia file.

Optionally, as another embodiment, the method 100 further includes: generating, by the terminal device according to content of a second multimedia file in the at least one multimedia file, summary information of the second multimedia file; putting, by the terminal device, the summary information of the second multimedia file into a label of the second multimedia file, and encrypting the label of the second multimedia file by using a first key; encrypting, by the terminal device, the content of the second multimedia file by using a second key, to obtain encrypted content of the second multimedia file; sending, by the terminal device, the label, which has been encrypted, of the second multimedia file and the encrypted content of the second multimedia file to the server; and receiving, by the terminal device, an address, in the server, of the label of the second multimedia file and an address, in the server, of the encrypted content of the second multimedia file that are returned by the server.

The method for searching for a multimedia file in this embodiment of the present disclosure achieves better compatibility, and the terminal device of the user does not need to apply to the TTP for a personal digital certificate. The first key and the second key may be a same key or may be different keys. When the summary information and content of the multimedia file are encrypted, a symmetric encryption manner may be used, or an asymmetric encryption manner may be used.

It can be learned from the method for searching for a multimedia file according to this embodiment of the present disclosure described above that, in this embodiment of the present disclosure, encryption and storage manners of summary information of a multimedia file are not limited. The summary information of the multimedia file may be stored separately after being encrypted; alternatively, the summary information of the multimedia file may also be stored in a manner of being put in a label. For example, the summary information of the multimedia file may be encrypted first, and then encrypted summary information of the multimedia file is put into the label of the multimedia file; or the summary information is put into the label of the multimedia file first, and then the label of the multimedia file is encrypted, that is, the summary information of the multimedia file is encrypted indirectly by encrypting the label in which the summary information of the multimedia file is located, which is not limited in the present disclosure.

Specifically, in this embodiment of the present disclosure, the address, in the server, of the label of the second multimedia file and the address, in the server, of the encrypted content of the second multimedia file may be a same address. That is, the label of the second multimedia file and the content of the second multimedia file are uploaded to the cloud server as an integrated multimedia file; when the cloud server receives a message for requesting the label of the second multimedia file, the cloud server first separates the label and encrypted content of the second multimedia file, and records a correspondence between the label and encrypted content of the second multimedia file, and then returns the label of the second multimedia file according to the received request.

Alternatively, in this embodiment of the present disclosure, the address, in the server, of the label of the second multimedia file and the address, in the server, of the encrypted content of the second multimedia file may be different addresses. Specifically, before the label and encrypted content of the second multimedia file are stored in the server, the method 100 for searching for a multimedia file according to this embodiment of the present disclosure further includes: separating, by the terminal device, the label of the second multimedia file and the encrypted content of the second multimedia file; and recording, by the terminal device, a correspondence between the label of the second multimedia file and the encrypted content of the second multimedia file.

In other words, a label and corresponding encrypted content of each multimedia file are separated and then uploaded to the cloud server as two parts; the cloud server separately returns an address, in the server, of the label of each multimedia file and an address, in the server, of the corresponding encrypted content; the terminal device may determine, for each multimedia file according to a recorded correspondence, the address of the encrypted content that corresponds to the label of the multimedia file. For example, a mark may be added to the label and corresponding encrypted content of the multimedia file, and the mark represents a one-to-one correspondence between the label and the corresponding encrypted content. When it is determined that the summary information in the label of the multimedia file corresponds to a target multimedia file, the address of the encrypted content that corresponds to the label of the multimedia file may be determined according to the correspondence between the label of the multimedia file and the content of the multimedia file, and then, the address of the encrypted content of the multimedia file is sent to the cloud server, to request the encrypted content of the multimedia file.

It should be understood that, the foregoing first multimedia file and second multimedia file may be a same multimedia file, or may be different multimedia files. For example, when the first multimedia file is a multimedia file stored by another terminal, the first multimedia file and the second multimedia file are different multimedia files, and when a terminal that stores the first multimedia file and a terminal that stores the second multimedia file are a same terminal, the first multimedia file and the second multimedia file are a same multimedia file.

Alternatively, after being separated, the label and corresponding encrypted content of each multimedia file may still be uploaded to the cloud server as an integrated multimedia file, and the cloud server returns a URL of the multimedia file. In other words, the label of the multimedia file and the encrypted content have a same URL in the cloud server, but the cloud server may separately take out the label or the corresponding encrypted content from the multimedia file according to a received request message.

Therefore, in this embodiment of the present disclosure, the separating label and encrypted content of each multimedia file and recording a correspondence between the label and encrypted content of each multimedia file may be performed by the terminal device of the user, or may be performed by the server, which is not limited in this embodiment of the present disclosure.

When the encrypted summary information of the multimedia file is not stored in a manner of being put in the label of the multimedia file, but the encrypted summary information of the multimedia file and an encrypted multimedia file (which includes the label and content of the multimedia file) are stored in the server separately, the terminal device of the user records a correspondence between the encrypted summary information of the multimedia file and the encrypted multimedia file. The encrypted summary information is directly acquired from the cloud server according to the address of the encrypted summary information and decrypted. When it is determined that summary information after the decryption corresponds to a target multimedia file to be searched for, the address of the encrypted multimedia file corresponding to the summary information may be obtained according to the correspondence between the encrypted summary information and the encrypted multimedia file, and the address, returned by the server, of the encrypted multimedia file.

Therefore, in the method for searching for a multimedia file according to this embodiment of the present disclosure, encrypted summary information of a multimedia file is acquired from a server and decrypted, and when summary information obtained after the decryption corresponds to a target multimedia file to be searched for, encrypted content corresponding to the summary information is acquired from the server, so that in a case in which a multimedia file is encrypted, the encrypted multimedia file can be quickly and conveniently found by searching encrypted summary information.

The method for searching for a multimedia file according to the foregoing embodiment of the present disclosure is described above from the perspective of a terminal device with reference to FIG. 1. Next, a method for searching for a multimedia file according to an embodiment of the present disclosure is described from the perspective of a server with reference to FIG. 2.

FIG. 2 shows a schematic flowchart of a method 200 for searching for a multimedia file according to another embodiment of the present disclosure. This method may be executed by any server that stores data by using a network, for example, executed by a cloud server, but the present disclosure is not limited thereto. The method of FIG. 2 corresponds to the method in the foregoing embodiment, and detailed descriptions are properly omitted herein. As shown in FIG. 2, the method 200 includes the following content.

210: The server receives a first request message sent by a terminal device, where the first request message is used to request encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file.

220: The server sends the encrypted summary information of the first multimedia file to the terminal device according to the first request message.

230: The server receives a second request message sent by the terminal device, where the second request message is used to request encrypted content of the first multimedia file corresponding to the encrypted summary information of the first multimedia file.

240: The server sends, to the terminal device according to the second request message, the encrypted content of the first multimedia file corresponding to the encrypted summary information of the first multimedia file.

Specifically, the server stores at least one encrypted multimedia file, where a label and content of the at least one multimedia file are separately encrypted. When the server receives a message, from the terminal device, for requesting a label of the first multimedia file, the server separates the label and encrypted content of the first multimedia file, records a correspondence between the label and encrypted content of the first multimedia file, and then sends the label of the first multimedia file to the terminal device.

Therefore, in the method for searching for a multimedia file in this embodiment of the present disclosure, encrypted summary information of a multimedia file is sent to a terminal device, so that the terminal device determines, according to the encrypted summary information, whether to acquire, from a server, encrypted content corresponding to the summary information, and therefore, in a case in which a multimedia file is encrypted, the encrypted multimedia file can be quickly and conveniently found by searching encrypted summary information.

Optionally, as another embodiment, the encrypted summary information of the first multimedia file is in a label of the first multimedia file, the label of the first multimedia file is a description about the first multimedia file, the first request message carries an address of the label of the first multimedia file and is used to request the label of the first multimedia file, and the sending, by the server, the encrypted summary information of the first multimedia file to the terminal device includes: sending, by the server, the label of the first multimedia file to the terminal device, where the second request message carries an address of the encrypted content of the first multimedia file, where the encrypted content of the first multimedia file corresponds to the label of the first multimedia file.

In other words, in the server, a label of each multimedia file and corresponding encrypted content of the multimedia file are stored as two parts; an address, in the server, of the label of the multimedia file and an address, in the server, of the corresponding encrypted content of the multimedia file are different addresses; the terminal device may record a correspondence between the address, in the server, of the label of each multimedia file and the address, in the server, of the corresponding encrypted content, and the server separately sends the label of the multimedia file and the encrypted content of the multimedia file to the terminal device according to the respective addresses.

Optionally, as another embodiment, the encrypted summary information of the first multimedia file is in a label of the first multimedia file, the label of the first multimedia file is a description about the first multimedia file, the first request message carries an address of the label of the first multimedia file and is used to request the label of the first multimedia file, and after the receiving, by a server, a first request message sent by a terminal device, the method 200 further includes: separating, by the server, the label of the first multimedia file and the encrypted content of the first multimedia file according to the first request message; and recording, by the server, a correspondence between the label of the first multimedia file and the encrypted content of the first multimedia file, where the sending, by the server, the encrypted summary information of the first multimedia file to the terminal device includes: sending, by the server, the label of the first multimedia file to the terminal device, where the second request message carries the address of the label of the first multimedia file; and after the receiving, by the server, a second request message sent by the terminal device, the method 200 further includes: determining, by the server according to the second request message and the correspondence, the encrypted content of the first multimedia file corresponding to the label of the first multimedia file.

In other words, in the server, a label and corresponding encrypted content of each multimedia file are stored as a whole; after separating the label and the encrypted content of the first multimedia file according to the address, in the first request message, of the label of the first multimedia file, the server sends the label of the first multimedia file to the terminal device.

Therefore, in the method for searching for a multimedia file in this embodiment of the present disclosure, encrypted summary information of a multimedia file is sent to a terminal device, so that the terminal device determines, according to the encrypted summary information, whether to acquire, from a server, encrypted content corresponding to the summary information, and therefore, in a case in which a multimedia file is encrypted, the encrypted multimedia file can be quickly and conveniently found by searching encrypted summary information.

Next, the method for searching for a multimedia file provided by the foregoing embodiment of the present disclosure is described in further detail with reference to specific examples of FIG. 3 and FIG. 4. In the embodiments of the present disclosure, considering security, a user encrypts backup multimedia files before uploading the backup multimedia files to a cloud server. For ease of description, the description is provided by using a cloud server and pictures as an example in the following, but the present disclosure is not limited thereto.

FIG. 3 shows a schematic flowchart of a method for searching for a multimedia file according to still another embodiment of the present disclosure. The method in FIG. 3 is an example of the method in FIG. 1, and detailed descriptions are properly omitted herein. As shown in FIG. 3, the method includes the following content.

301: A terminal device extracts a thumbnail of each picture in multiple pictures to be uploaded to a cloud server for storage, and puts the extracted thumbnail into a label of the corresponding picture.

302: The terminal device separately encrypts the label of each picture and content of each picture by using multiple different keys.

303: The terminal device separates an encrypted label and encrypted content of each picture in the multiple pictures, and records a correspondence between the encrypted label and encrypted content of each picture (for example, a mark may be separately added to the label and content of each picture, where the mark indicates the correspondence between the label and the content), so that after being uploaded to the cloud server, the content of each picture can still correspond to the label of this picture.

304: The terminal device uploads encrypted content and encrypted labels of the multiple pictures to the cloud server for storage.

305. The cloud server receives the multiple pictures (including the encrypted labels of the pictures and the encrypted content of the pictures) and stores the multiple pictures therein, and returns address information URLs of the multiple pictures (including URLs of the encrypted labels of the pictures and URLs of the encrypted content of the pictures) in the cloud server to the terminal device.

After the foregoing steps, a process of storing and backing up, by the terminal device, encrypted pictures in the cloud server is completed.

When the user wants to retrieve some pictures (which are represented by target pictures in the following) from the multiple encrypted pictures stored in the cloud server, the user logs into a personal account that is used on the cloud server, and after successfully logging into the personal account, the user opens a folder of the backup encrypted multimedia files. In this case, the user sees a prompt interface (such as a dialog box), and the user needs to determine which files are going to be downloaded: for example, labels of multimedia files, content of multimedia files, or multimedia files, which are not limited in this embodiment of the present disclosure. In this embodiment of the present disclosure, the user determines to download labels of multimedia files, and next, the terminal device of the user needs to complete the following operations:

306: The terminal device requests, according to the URLs, returned by the cloud server, of the encrypted labels of the multiple pictures, the encrypted labels, corresponding to the URLs, of the multiple pictures from the cloud server.

307: In response to the request of the terminal device, the cloud server returns the encrypted labels, corresponding to the URLs, of the multiple pictures to the terminal device.

308: The terminal device separately decrypts the labels of the multiple pictures by using the multiple keys that are used to encrypt the labels of the multiple pictures in 302, extracts a thumbnail from the label of each picture after the decryption, and determines, according to the thumbnail, whether the corresponding picture is a target picture.

309: When it is determined that the thumbnail corresponds to a target picture, the terminal sends, according to the correspondence between the encrypted label and the encrypted content of each picture in 303, a URL of encrypted content corresponding to the thumbnail of the target picture to the cloud server, to request the corresponding encrypted content.

310: The cloud server receives the request that is sent by the terminal device in 309, and returns the encrypted content corresponding to the URL to the terminal device.

311: The terminal device receives the encrypted content, returned by the cloud server, of the target picture, and performs decryption by using the key that is used to encrypt the content of the picture in 302, to obtain the target picture.

Therefore, in the method for searching for a multimedia file according to this embodiment of the present disclosure, encrypted summary information of a multimedia file is acquired from a server and decrypted, and when summary information obtained after the decryption corresponds to a target multimedia file to be searched for, encrypted content corresponding to the summary information is acquired from the server, so that in a case in which a multimedia file is encrypted, the encrypted multimedia file can be quickly and conveniently found by searching encrypted summary information.

Figure 4:
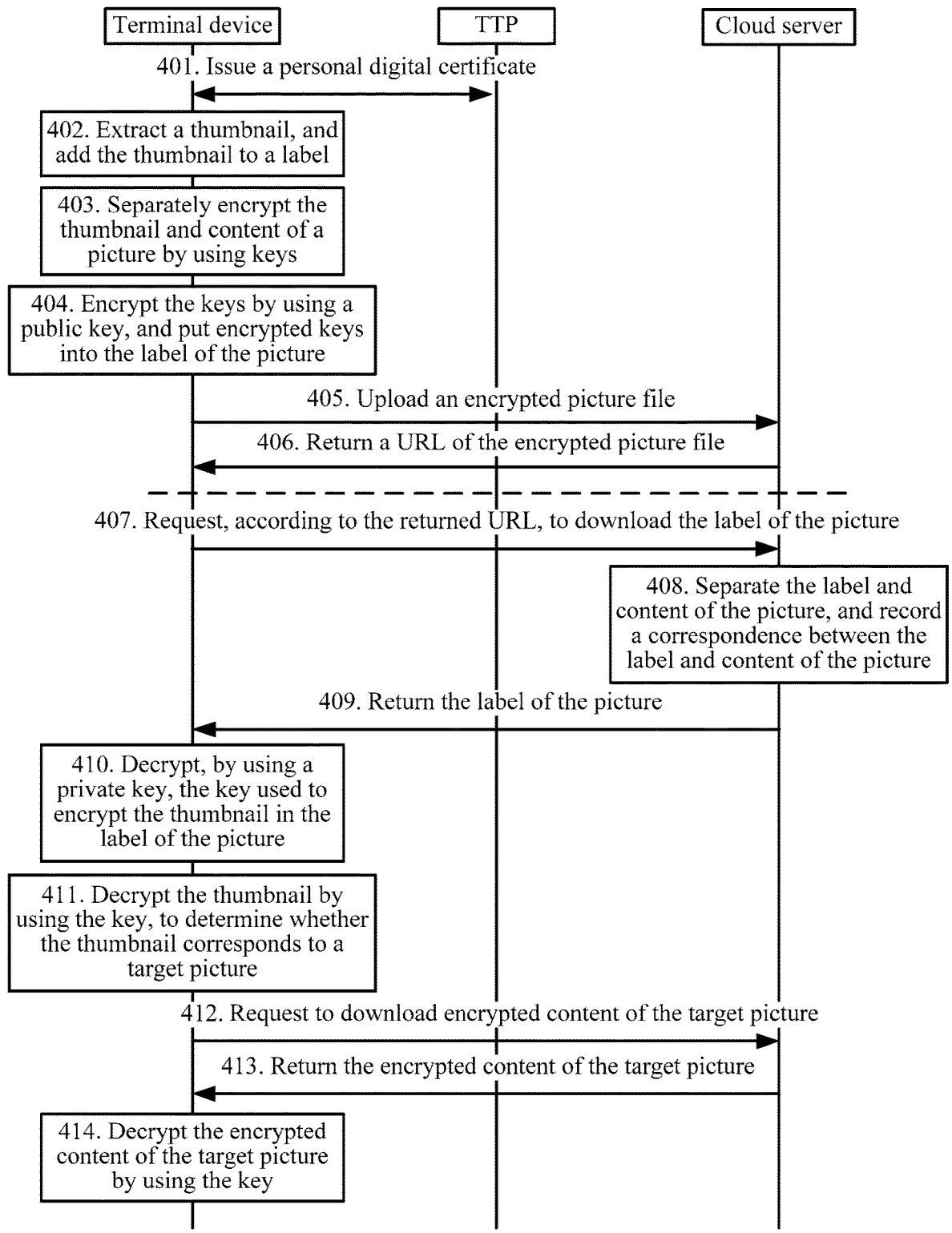
FIG. 4 is a schematic flowchart of a method for searching for a multimedia file according to still another embodiment of the present disclosure.

FIG. 4 shows a schematic flowchart of a method for searching for a multimedia file according to still another embodiment of the present disclosure. In this embodiment, a TTP is deployed. The method in FIG. 4 is an example of the method in FIG. 1, and detailed descriptions are properly omitted herein. As shown in FIG. 4, the method includes the following content.

401: A TTP issues a personal digital certificate to a terminal device (a cloud consumer).

402: The terminal device extracts a thumbnail of each picture in multiple pictures to be uploaded to a cloud server for storage.

403: The terminal device separately encrypts the thumbnail of each picture and content of each picture by using multiple different keys, and puts an encrypted thumbnail into a label of the corresponding picture.

404: The terminal device separately performs, by using a public key of the terminal device, encryption processing on the multiple keys that are used to encrypt the thumbnail of each picture and the content of each picture in 403, and puts multiple encrypted keys into the label of the corresponding picture for storage.

405: The terminal device uploads the multiple pictures (including encrypted content of the pictures and labels of the pictures) on which encryption processing has been performed to the cloud server for storage.

406: The cloud server receives the multiple pictures which are uploaded in 405 and on which encryption processing has been performed and stores the multiple pictures therein, and returns address information URLs, in the cloud server, of the multiple pictures on which encryption processing has been performed to the terminal device.

After the foregoing steps, a process of storing and backing up, by the terminal device, encrypted pictures in the cloud server is completed.

When the user wants to retrieve some pictures (which are represented by target pictures in the following) from the multiple encrypted pictures stored in the cloud server, the user logs into a personal account that is used on the cloud server, and after successfully logging into the personal account, the user opens a folder of the backup encrypted multimedia files. In this case, the user sees a prompt interface (such as a dialog box), and the user needs to determine which files are going to be downloaded: for example, labels of multimedia files, content of multimedia files, or multimedia files, which are not limited in this embodiment of the present disclosure. In this embodiment of the present disclosure, the user determines to download labels of multimedia files, and next, the terminal device of the user needs to complete the following operations:

407: The terminal device requests, according to the URLs previously returned by the cloud server, the labels, corresponding to the URLs, of the pictures from the cloud server.

408: In response to the request of the terminal device, the cloud server separates the encrypted content and label of each picture in the multiple pictures which are uploaded by the terminal device and on which encryption processing has been performed, and records a correspondence between the encrypted content and label of each picture; in other words, encrypted content and a label of a picture having a given URL correspond to each other.

409: The cloud server returns multiple labels, obtained by means of separation, of the multiple pictures on which encryption processing has been performed to the terminal device.

410: The terminal device performs decryption by using a private key, to obtain the multiple keys that are in the label of each picture and that are used to separately encrypt the thumbnail and content of each picture.

411: The terminal device separately decrypts thumb nails in multiple labels by using multiple keys that are obtained by means of decryption in 410, and determines whether a picture corresponding to a given thumbnail is a target picture.

412: When it is determined that a thumbnail that is obtained by means of decryption in 411 corresponds to a target picture, the terminal device sends a URL of the thumbnail of the target picture to the cloud server, to request encrypted content of the target picture.

413: The cloud server receives the request that is sent by the terminal device in 412, and returns the encrypted content corresponding to the URL of the thumbnail of the target picture to the terminal device.

414: The terminal device receives the encrypted content, returned by the cloud server, of the target picture, and performs decryption by using a key that is obtained by means of decryption in 410 and that is used to encrypt content of the target picture, to obtain the target picture.

Therefore, in the method for searching for a multimedia file according to this embodiment of the present disclosure, encrypted summary information of a multimedia file is acquired from a server and decrypted, and when summary information obtained after the decryption corresponds to a target multimedia file to be searched for, encrypted content corresponding to the summary information is acquired from the server, so that in a case in which a multimedia file is encrypted, the encrypted multimedia file can be quickly and conveniently found by searching encrypted summary information.

It should be noted that the examples in FIG. 3 and FIG. 4 are used to help a person skilled in the art better understand the embodiments of the present disclosure, rather than limit the scope of the embodiments of the present disclosure. Apparently, a person skilled in the art may make various equivalent modifications or changes according to the examples provided in FIG. 3 and FIG. 4, and such modifications or changes also fall within the scope of the embodiments of the present disclosure. It should be understood that sequence numbers of the foregoing processes do not mean execution sequences. The execution sequences of the processes should be determined according to functions and internal logic of the processes, and should not be construed as any limitation on the implementation processes of the embodiments of the present disclosure.

The method for searching for a multimedia file according to the embodiments of the present disclosure is described above with reference to FIG. 1 to FIG. 4. A terminal device and a server according to the embodiments of the present disclosure are described in detail below with reference to FIG. 5 to FIG. 11.

Figure 5:
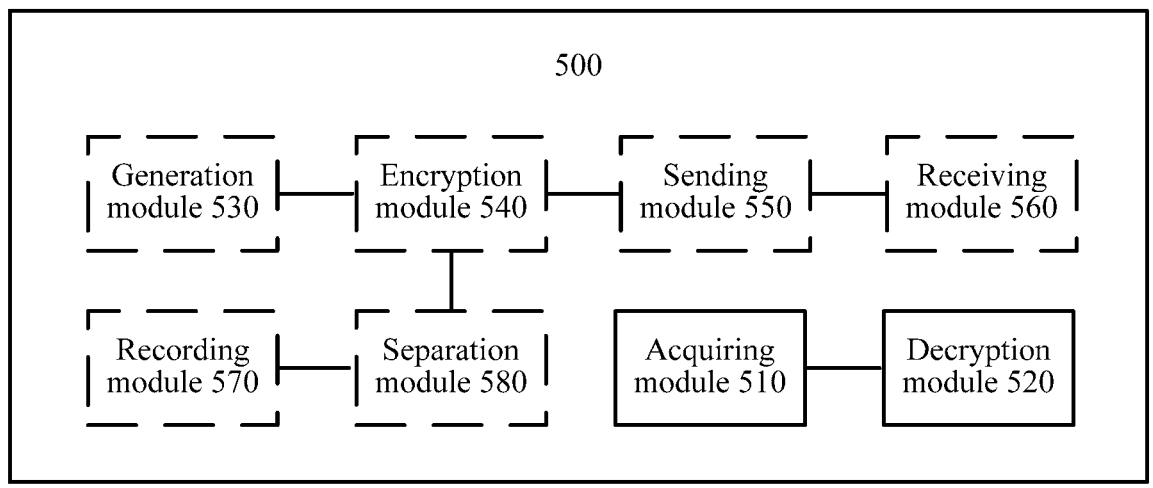
FIG. 5 is a schematic block diagram of a terminal device according to an embodiment of the present disclosure.

FIG. 5 shows a schematic block diagram of a terminal device 500 according to an embodiment of the present disclosure. As shown in FIG. 5, the terminal device 500 includes: an acquiring module 510 and a decryption module 520.

The acquiring module 510 is configured to acquire, from a server, encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file.

The decryption module 520 is configured to decrypt the encrypted summary information of the first multimedia file, to obtain summary information of the first multimedia file.

The acquiring module 510 is further configured to: when it is determined that the summary information of the first multimedia file corresponds to a target multimedia file, acquire, from the server, encrypted content of the first multimedia file corresponding to the summary information of the first multimedia file.

Specifically, the server may be a cloud server, may be a server on the Internet, or may be another server that stores data by using a network, for example, a web disk, which is not limited in the present disclosure. The multimedia file may be a picture, a video, an audio, or the like. In this embodiment of the present disclosure, the content of the multimedia file refers to the multimedia file itself, and the summary information of the multimedia file may be simplified information that can reflect the content of the multimedia file. In other words, a user may determine content of a multimedia file according to summary information of the multimedia file. For example: for a picture, the summary information may be a thumbnail of the picture; for a video, the summary information may be one or several frames of static pictures or a video clip; and for an audio, the summary information may be a climax part or a representative part of the audio, but the present disclosure is not limited thereto.

Therefore, a terminal device according to this embodiment of the present disclosure acquires encrypted summary information of a multimedia file from a server and decrypts the encrypted summary information, and when summary information after the decryption corresponds to a target multimedia file to be searched for, the terminal device acquires encrypted content corresponding to the summary information from the server, so that in a case in which a multimedia file is encrypted, the encrypted multimedia file can be quickly and conveniently found by searching encrypted summary information.

Optionally, as another embodiment, the encrypted summary information of the first multimedia file is in a label of the first multimedia file, and the label of the first multimedia file is a description about a multimedia file of the first multimedia file. The acquiring module 510 is further configured to: before acquiring the encrypted summary information of the first multimedia file from the server, acquire an address, in the server, of the label of the first multimedia file and an address, in the server, of the encrypted content of the first multimedia file corresponding to the label of the first multimedia file. The acquiring module 510 is specifically configured to: send a first request message to the server, where the first request message carries the address, in the server, of the label of the first multimedia file and is used to request the label of the first multimedia file; receive the label, sent by the server, of the first multimedia file; acquire the encrypted summary information of the first multimedia file according to the label of the first multimedia file; send a second request message to the server, where the second request message carries the address, in the server, of the encrypted content of the first multimedia file corresponding to the label of the first multimedia file, and is used to request the encrypted content of the first multimedia file; and receive the encrypted content, sent by the server, of the first multimedia file.

In other words, in this embodiment of the present disclosure, the summary information of the multimedia file is stored in a manner of being put in the label of the multimedia file. Specifically, when the user searches encrypted summary information of multimedia files by using the terminal device so as to find and download some specific multimedia files in the cloud server, the user may first download, from the cloud server, labels, including the summary information, of the multimedia files, and then determine, according to the summary information in the labels, whether to download target multimedia files from the server.

Specifically, as another embodiment, the address, in the server, of the label of the first multimedia file and the address, in the server, of the encrypted content of the first multimedia file are a same address or different addresses.

Optionally, as another embodiment, the terminal device 500 further includes: a generation module 530, an encryption module 540, a sending module 550, and a receiving module 560.

The generation module 530 is configured to generate, according to content of a second multimedia file in the at least one multimedia file, summary information of the second multimedia file. The encryption module 540 is configured to encrypt the summary information of the second multimedia file by using a first key, to obtain encrypted summary information of the second multimedia file, and put the encrypted summary information of the second multimedia file into a label of the second multimedia file; and is further configured to encrypt the content of the second multimedia file by using a second key, to obtain encrypted content of the second multimedia file. The sending module 550 is configured to send the label of the second multimedia file and the encrypted content of the second multimedia file to the server. The receiving module 560 is configured to receive an address, in the server, of the label of the second multimedia file and an address, in the server, of the encrypted content of the second multimedia file that are returned by the server.

For example, the first key and the second key may be a same key or may be different keys. When the encryption module encrypts the summary information and content of the multimedia file, a symmetric encryption manner may be used or an asymmetric encryption manner may be used.

Optionally, as another embodiment, the receiving module 560 is further configured to: before the sending module sends the label of the second multimedia file and the encrypted content of the second multimedia file to the server, receive a personal digital certificate issued by a trusted third party TTP. The encryption module 540 is further configured to encrypt the first key and the second key by using a public key corresponding to the personal digital certificate, and put an encrypted first key and an encrypted second key into the label of the second multimedia file. The decryption module 520 is further configured to: after the receiving module 560 receives the label, sent by the server, of the second multimedia file, decrypt, by using a private key corresponding to the public key, the encrypted first key and the encrypted second key that are in the label of the second multimedia file.

Optionally, as another embodiment, the generation module 530 is configured to generate, according to content of a second multimedia file in the at least one multimedia file, summary information of the second multimedia file. The encryption module 540 is configured to put the summary information of the second multimedia file into a label of the second multimedia file and encrypt the label of the second multimedia file by using the first key; and is further configured to encrypt the content of the second multimedia file by using the second key, to obtain encrypted content of the second multimedia file. The sending module 550 is configured to send the label, which has been encrypted, of the second multimedia file and the encrypted content of the second multimedia file to the server.

Therefore, a terminal device according to this embodiment of the present disclosure acquires encrypted summary information of a multimedia file from a server and decrypts the encrypted summary information, and when summary information after the decryption corresponds to a target multimedia file to be searched for, the terminal device acquires encrypted content corresponding to the summary information from the server, so that in a case in which a multimedia file is encrypted, the encrypted multimedia file can be quickly and conveniently found by searching encrypted summary information.

Optionally, in another embodiment according to the present disclosure, the address, in the server, of the label of the second multimedia file and the address, in the server, of the encrypted content of the second multimedia file are different addresses, and the terminal device 500 further includes: a separation module 570, configured to: before the terminal device sends the label of the second multimedia file and the encrypted content of the second multimedia file to the server, separate the label of the second multimedia file and the encrypted content of the second multimedia file; and a recording module 580, configured to record a correspondence between the label of the second multimedia file and the encrypted content of the second multimedia file.

In other words, a label and corresponding encrypted content of each multimedia file are separated and then uploaded to the cloud server as two parts; the cloud server separately returns an address, in the server, of the label of each multimedia file and an address, in the server, of the corresponding encrypted content; the terminal device may determine, for each multimedia file according to a recorded correspondence, the address of the encrypted content that corresponds to the label of the multimedia file. For example, a mark may be added to the label and corresponding encrypted content of the multimedia file, and the mark represents a one-to-one correspondence between the label and the corresponding encrypted content. When it is determined that the summary information in the label of the multimedia file corresponds to a target multimedia file, the address of the encrypted content that corresponds to the label of the multimedia file may be determined according to the correspondence between the label of the multimedia file and the content of the multimedia file, that is, an address of encrypted content that corresponds to the label of the target multimedia file is determined, and then, the address of the encrypted content of the target multimedia file is sent to the cloud server, to request the encrypted content of the target multimedia file.

Therefore, in this embodiment of the present disclosure, the separating label and encrypted content of each multimedia file and recording a correspondence between the label and encrypted content of each multimedia file may be performed by the terminal device of the user, or may be performed by the cloud server, which is not limited in this embodiment of the present disclosure.

It should be understood that, the terminal device according to this embodiment of the present disclosure shown in FIG. 5 may correspond to the terminal device in the method for searching for a multimedia file according to the foregoing embodiment of the present disclosure, and the foregoing and other operations and/or functions of the modules in the terminal device 500 are separately used for implementing corresponding processes of the method 100 shown in FIG. 1, and for the purpose of brevity, details are not described herein again.

Therefore, a terminal device according to this embodiment of the present disclosure acquires encrypted summary information of a multimedia file from a server and decrypts the encrypted summary information, and when summary information after the decryption corresponds to a target multimedia file to be searched for, the terminal device acquires encrypted content corresponding to the summary information from the server, so that in a case in which a multimedia file is encrypted, the encrypted multimedia file can be quickly and conveniently found by searching encrypted summary information.

The terminal device according to the foregoing embodiment of the present disclosure is described in detail above with reference to FIG. 5. A server according to an embodiment of the present disclosure is described in detail below with reference to FIG. 6.

Figure 6:
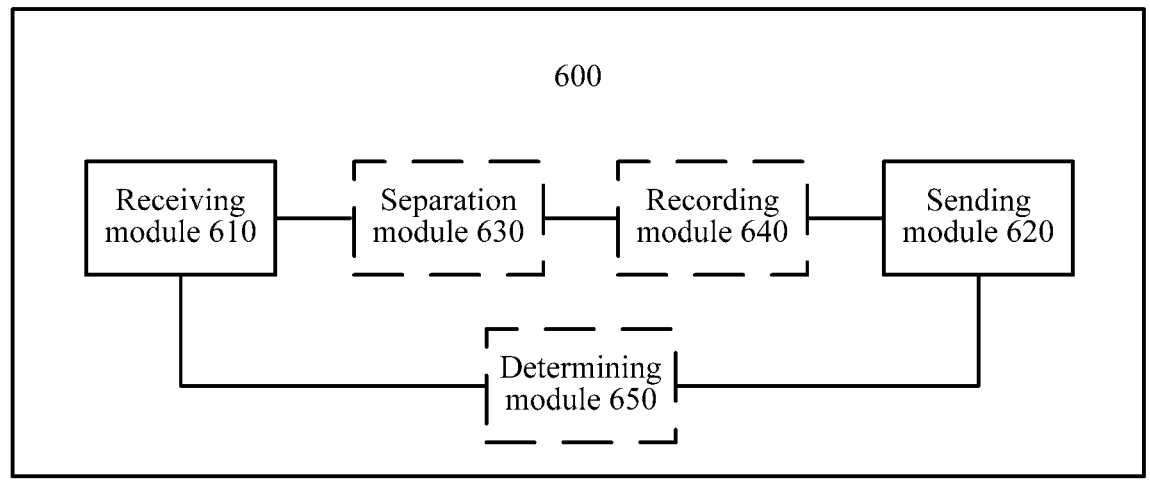
FIG. 6 is a schematic block diagram of a server according to an embodiment of the present disclosure.

FIG. 6 shows a schematic block diagram of a server 600 according to an embodiment of the present disclosure. As shown in FIG. 6, the server 600 includes: a receiving module 610 and a sending module 620.

The receiving module 610 is configured to receive a first request message sent by a terminal device, where the first request message is used to request encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file. The sending module 620 is configured to send the encrypted summary information of the first multimedia file to the terminal device according to the first request message. The receiving module 610 is further configured to receive a second request message sent by the terminal device, where the second request message is used to request encrypted content of the first multimedia file corresponding to the encrypted summary information of the first multimedia file. The sending module 620 is further configured to send, to the terminal device according to the second request message, the encrypted content of the first multimedia file corresponding to the encrypted summary information of the first multimedia file.

Therefore, a server according to this embodiment of the present disclosure sends encrypted summary information of a multimedia file to a terminal device, so that the terminal device determines, according to the encrypted summary information, whether to acquire, from the server, encrypted content corresponding to the summary information, and therefore, in a case in which a multimedia file is encrypted, the encrypted multimedia file can be quickly and conveniently found by searching encrypted summary information.

Optionally, as another embodiment, the encrypted summary information of the first multimedia file is in a label of the first multimedia file, the label of the first multimedia file is a description about the first multimedia file, the first request message carries an address of the label of the first multimedia file and is used to request the label of the first multimedia file, and the sending module 610 is specifically configured to send the label of the first multimedia file to the terminal device, where the second request message carries an address of the encrypted content of the first multimedia file, where the encrypted content of the first multimedia file corresponds to the label of the first multimedia file.

Optionally, as another embodiment, the encrypted summary information of the first multimedia file is in a label of the first multimedia file, the label of the first multimedia file is a description about the first multimedia file, the first request message carries an address of the label of the first multimedia file and is used to request the label of the first multimedia file, and the server 600 further includes: a separation module 630, a recording module 640, and a determining module 650.

The separation module 630 is configured to separate the label of the first multimedia file and the encrypted content of the first multimedia file according to the first request message. The recording module 640 is configured to record a correspondence between the label of the first multimedia file and the encrypted content of the first multimedia file, where the sending module 620 is specifically configured to send the label of the first multimedia file to the terminal device, where the second request message carries the address of the label of the first multimedia file, and the server 600 further includes: a determining module 650, configured to determine, according to the second request message and the correspondence, the encrypted content of the first multimedia file corresponding to the label of the first multimedia file.

It should be understood that, the server 600 according to this embodiment of the present disclosure may correspond to the server in the method for searching for a multimedia file according to the foregoing embodiment of the present disclosure, and the foregoing and other operations and/or functions of the modules in the server 600 are separately used for implementing corresponding processes of the method 200 shown in FIG. 2, and for the purpose of brevity, details are not described herein again.

Therefore, a server according to this embodiment of the present disclosure sends encrypted summary information of a multimedia file to a terminal device, so that the terminal device determines, according to the encrypted summary information, whether to acquire, from the server, encrypted content corresponding to the summary information, and therefore, in a case in which a multimedia file is encrypted, the encrypted multimedia file can be quickly and conveniently found by searching encrypted summary information.

Figure 7:
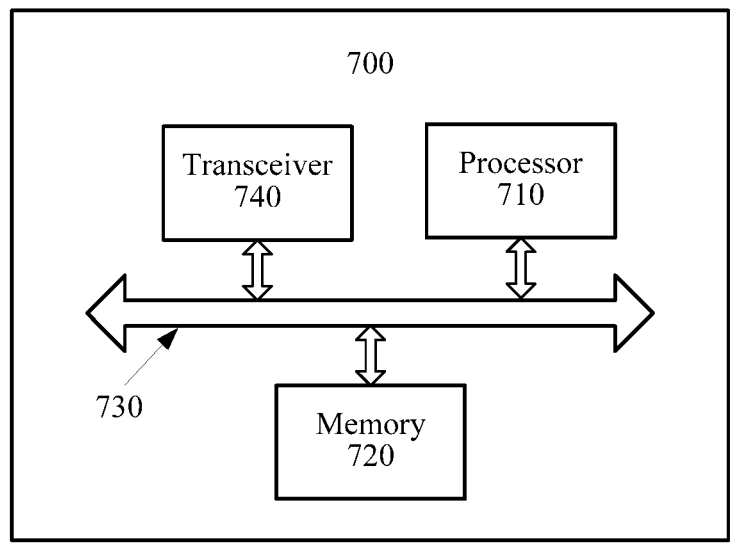
FIG. 7 is a schematic block diagram of a terminal device according to another embodiment of the present disclosure.

FIG. 7 shows a schematic block diagram of a terminal device 700 according to another embodiment of the present disclosure. As shown in FIG. 7, the terminal device 700 includes a processor 710, a memory 720, a bus system 730, and a transceiver 740. The processor 710, the memory 720, and the transceiver 740 are connected by using the bus system 730, where the memory 720 is configured to store an instruction, and the processor 710 is configured to execute the instruction stored in the memory 720.

The transceiver 740 is configured to acquire, from a server, encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file. The processor 710 is configured to decrypt the encrypted summary information of the first multimedia file, to obtain summary information of the first multimedia file. The processor 710 is further configured to: when it is determined that the summary information of the first multimedia file corresponds to a target multimedia file, acquire, from the server, encrypted content of the first multimedia file corresponding to the summary information of the first multimedia file.

Therefore, a terminal device according to this embodiment of the present disclosure acquires encrypted summary information of a multimedia file from a server and decrypts the encrypted summary information, and when summary information after the decryption corresponds to a target multimedia file to be searched for, the terminal device acquires encrypted content corresponding to the summary information from the server, so that in a case in which a multimedia file is encrypted, the encrypted multimedia file can be quickly and conveniently found by searching encrypted summary information.

It should be understood that, in this embodiment of the present disclosure, the processor 710 may be a central processing unit (CPU); the processor 710 may also be another universal processor, a digital signal processor (DSP), an application-specific integrated circuit (ASIC), a field programmable gate array (FPGA) or another programmable logic device, a discrete gate or transistor logic device, a discrete hardware component, or the like. The universal processor may be a microprocessor, or the processor may also be any regular processor or the like.

The memory 720 may include a read-only memory and a random access memory, and provide an instruction and data for the processor 710. A part of the memory 720 may further include a non-volatile random access memory. For example, the memory 720 may further store information about a device type.

In addition to a data bus, the bus system 730 may further include a power bus, a control bus, a status signal bus, and the like. For the purpose of clarity, all buses in the figure are marked as the bus system 730.

In an implementation process, the steps of the foregoing method may be completed by using a hardware integrated logic circuit in the processor 710 or a software-form instruction. The steps of the method disclosed with reference to the embodiments of the present disclosure may be directly embodied as being executed by a hardware processor, or executed by a combination of hardware in the processor and software modules. The software modules may be located in a mature storage medium in the art, for example, a random memory, a flash memory, a read-only memory, a programmable read-only memory or an electrically erasable programmable memory, or a register. The storage medium is located in the memory 720, the processor 710 reads information in the memory 720, and completes the steps of the foregoing method in combination with the hardware thereof. To avoid repetition, details are not described herein again.

Optionally, as another embodiment, the encrypted summary information of the first multimedia file is in a label of the first multimedia file, and the label of the first multimedia file is a description about a multimedia file of the first multimedia file. The transceiver 740 is further configured to: before acquiring the encrypted summary information of the first multimedia file from the server, acquire an address, in the server, of the label of the first multimedia file and an address, in the server, of the encrypted content of the first multimedia file corresponding to the label of the first multimedia file. The transceiver 740 is specifically configured to: send a first request message to the server, where the first request message carries the address, in the server, of the label of the first multimedia file and is used to request the label of the first multimedia file; receive the label, sent by the server, of the first multimedia file; acquire the encrypted summary information of the first multimedia file according to the label of the first multimedia file; send a second request message to the server, where the second request message carries the address, in the server, of the encrypted content of the first multimedia file corresponding to the label of the first multimedia file, and is used to request the encrypted content of the first multimedia file; and receive the encrypted content, sent by the server, of the first multimedia file.

Specifically, in this embodiment of the present disclosure, the address, in the server, of the label of the first multimedia file, and the address, in the server, of the encrypted content of the first multimedia file are a same address or different addresses.

Optionally, as another embodiment, the processor 710 is further configured to generate, according to a second multimedia file in the at least one multimedia file, summary information of the second multimedia file; encrypt the summary information of the second multimedia file by using a first key, to obtain encrypted summary information of the second multimedia file, and put the encrypted summary information of the second multimedia file into a label of the second multimedia file; and encrypt content of the second multimedia file by using a second key, to obtain encrypted content of the second multimedia file. The transceiver 740 is further configured to send the label of the second multimedia file and the encrypted content of the second multimedia file to the server, and receive an address, in the server, of the label of the second multimedia file and an address, in the server, of the encrypted content of the second multimedia file that are returned by the server.

Optionally, in another embodiment of the present disclosure, the transceiver 740 is further configured to: before the transceiver 740 sends the label of the second multimedia file and the encrypted content of the second multimedia file to the server, receive a personal digital certificate issued by a trusted third party TTP. The processor 710 is further configured to: encrypt the first key and the second key by using a public key corresponding to the personal digital certificate received by the transceiver 740, and put an encrypted first key and an encrypted second key into the label of the second multimedia file; and after the transceiver 740 receives the label of the second multimedia file sent by the server, decrypt the encrypted first key and the encrypted second key in the label of the second multimedia file by using a private key corresponding to the public key.

Alternatively, as another embodiment, the processor 710 is further configured to: generate, according to a second multimedia file in the at least one multimedia file, summary information of the second multimedia file; put the summary information of the second multimedia file into a label of the second multimedia file, and encrypt the label of the second multimedia file by using the first key; and encrypt content of the second multimedia file by using the second key, to obtain encrypted content of the second multimedia file. The transceiver 740 is further configured to send the label, which has been encrypted, of the second multimedia file and the encrypted content of the second multimedia file to the server, and receive an address, in the server, of the label of the second multimedia file and an address, in the server, of the encrypted content of the second multimedia file that are returned by the server.

Optionally, as another embodiment, the address, in the server, of the label of the second multimedia file and the address, in the server, of the encrypted content of the second multimedia file are different addresses, and the processor 710 is further configured to: before the terminal device sends the label of the second multimedia file and the encrypted content of the second multimedia file to the server, separate the label of the second multimedia file and the encrypted content of the second multimedia file; and record a correspondence between the label of the second multimedia file and the encrypted content of the second multimedia file.

It should be understood that, the terminal device 700 according to this embodiment of the present disclosure may correspond to the terminal device in the method 100 for searching for a multimedia file according to the foregoing embodiment of the present disclosure and the terminal device 500 according to the foregoing embodiment of the present disclosure, and the foregoing and other operations and/or functions of the modules in the terminal device 700 are separately used for implementing corresponding processes of the method 100 shown in FIG. 1, and for the purpose of brevity, details are not described herein again.

Therefore, a terminal device according to this embodiment of the present disclosure acquires encrypted summary information of a multimedia file from a server and decrypts the encrypted summary information, and when summary information after the decryption corresponds to a target multimedia file to be searched for, the terminal device acquires encrypted content corresponding to the summary information from the server, so that in a case in which a multimedia file is encrypted, the encrypted multimedia file can be quickly and conveniently found by searching encrypted summary information.

Figure 8:
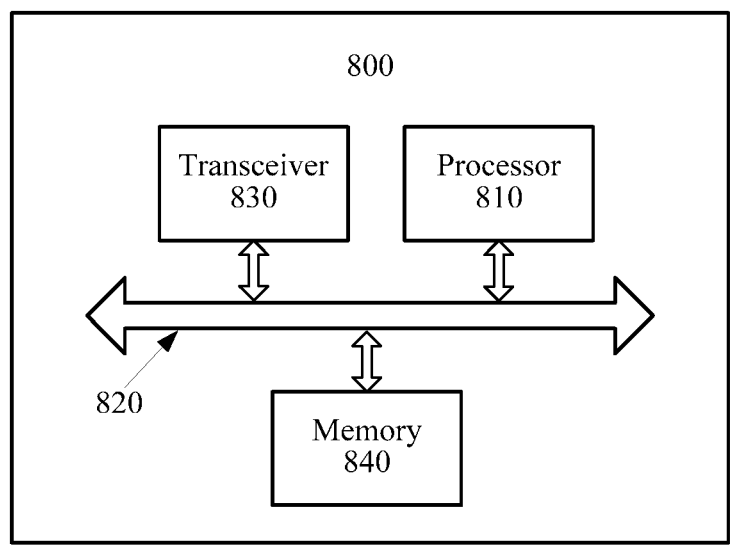
FIG. 8 is a schematic block diagram of a server according to another embodiment of the present disclosure.

FIG. 8 shows a schematic block diagram of a server 800 according to another embodiment of the present disclosure. As shown in FIG. 8, the server 800 includes a processor 810, a bus system 820, a transceiver 830, and a memory 840. The processor 810, the transceiver 830, and the memory 840 are connected by using the bus system 820, where the memory 840 is configured to store an instruction, and the processor 810 is configured to execute the instruction stored in the memory 840.

The processor 810 is configured to control, by using the bus system 820, the transceiver 830 to receive a first request message sent by a terminal device, where the first request message is used to request encrypted summary information of a first multimedia file in at least one multimedia file, where encrypted content of the at least one multimedia file and encrypted summary information of the at least one multimedia file are stored in the server, and the encrypted summary information of the at least one multimedia file corresponds to the encrypted content of the at least one multimedia file; send the encrypted summary information of the first multimedia file to the terminal device according to the first request message; receive a second request message sent by the terminal device, where the second request message is used to request encrypted content of the first multimedia file corresponding to the encrypted summary information of the first multimedia file; and send, to the terminal device according to the second request message, the encrypted content of the first multimedia file corresponding to the summary information of the first multimedia file.

Therefore, a server according to this embodiment of the present disclosure sends encrypted summary information of a multimedia file to a terminal device, so that the terminal device determines, according to the encrypted summary information, whether to acquire, from the server, encrypted content corresponding to the summary information, and therefore, in a case in which a multimedia file is encrypted, the encrypted multimedia file can be quickly and conveniently found by searching encrypted summary information.

It should be understood that, in this embodiment of the present disclosure, the processor 810 may be a central processing unit (CPU); the processor 810 may also be another universal processor, a digital signal processor (DSP), an application-specific integrated circuit (ASIC), a field programmable gate array (FPGA) or another programmable logic device, a discrete gate or transistor logic device, a discrete hardware component, or the like. The universal processor may be a microprocessor, or the processor may also be any regular processor or the like.

In addition to a data bus, the bus system 820 may further include a power bus, a control bus, a status signal bus, and the like. For the purpose of clarity, all buses in the figure are marked as the bus system 820.

In an implementation process, the steps of the foregoing method may be completed by using a hardware integrated logic circuit in the processor 810 or a software-form instruction. The steps of the method disclosed with reference to the embodiments of the present disclosure may be directly embodied as being executed by a hardware processor, or executed by a combination of hardware in the processor and software modules. The software modules may be located in a mature storage medium in the art, for example, a random memory, a flash memory, a read-only memory, a programmable read-only memory or an electrically erasable programmable memory, or a register. To avoid repetition, details are not described herein again.

Optionally, as another embodiment, the encrypted summary information of the first multimedia file is in a label of the first multimedia file, the label of the first multimedia file is a description about the first multimedia file, the first request message carries an address of the label of the first multimedia file and is used to request the label of the first multimedia file, and the processor 810 is configured to control the transceiver 830 to send the label of the first multimedia file to the terminal device, where the second request message carries an address of the encrypted content of the first multimedia file, where the encrypted content of the first multimedia file corresponds to the label of the first multimedia file.

Optionally, as another embodiment, the encrypted summary information of the first multimedia file is in a label of the first multimedia file, the label of the first multimedia file is a description about the first multimedia file, the first request message carries an address of the label of the first multimedia file and is used to request the label of the first multimedia file. The processor 810 is further configured to: separate the label and the encrypted content of the first multimedia file according to the first request message; and record a correspondence between the label of the first multimedia file and the encrypted content of the first multimedia file. The transceiver 830 is specifically configured to send the label of the first multimedia file to the terminal device, where the second request message carries the address of the label of the first multimedia file. The processor 810 is further configured to determine, according to the second request message and the correspondence, the encrypted content of the first multimedia file corresponding to the label of the first multimedia file.

It should be understood that, the server 800 according to this embodiment of the present disclosure may correspond to the server in the method 200 for searching for a multimedia file according to the foregoing embodiment of the present disclosure and the server 600 according to the foregoing embodiment of the present disclosure, and the foregoing and other operations and/or functions of the modules in the server 800 are separately used for implementing corresponding processes of the method 200 shown in FIG. 2, and for the purpose of brevity, details are not described herein again.

Therefore, a server according to this embodiment of the present disclosure sends encrypted summary information of a multimedia file to a terminal device, so that the terminal device determines, according to the encrypted summary information, whether to acquire, from the server, encrypted content corresponding to the summary information, and therefore, in a case in which a multimedia file is encrypted, the encrypted multimedia file can be quickly and conveniently found by searching encrypted summary information.

For a multimedia file, in general cases, a user needs to open and view the multimedia file, to determine content of the multimedia file. When the multimedia file is relatively large, it takes a long time to download or open the multimedia file.

Figure 9:
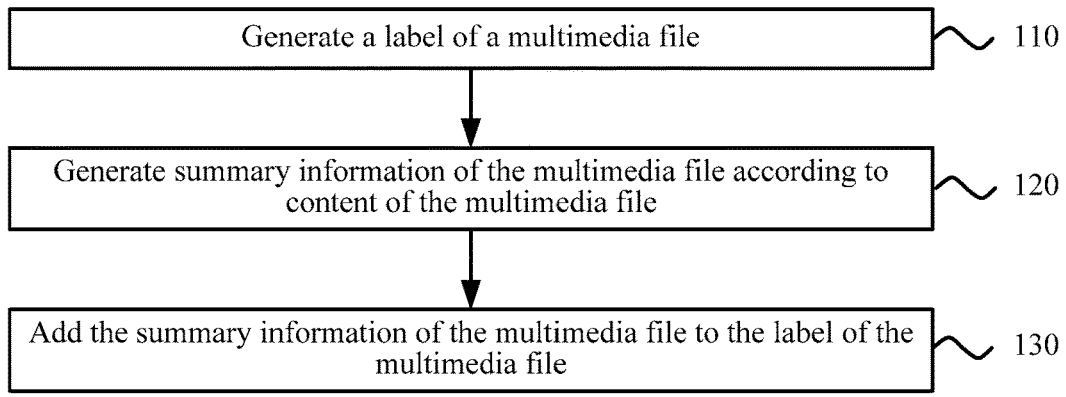
FIG. 9 is a schematic flowchart of a method for generating a label of a multimedia file according to an embodiment of the present disclosure.

FIG. 9 shows a schematic flowchart of a method 900 for generating a label of a multimedia file according to an embodiment of the present disclosure. As shown in FIG. 9, the method 900 includes the following content.

910: Generate a label of a multimedia file.

920: Generate summary information of the multimedia file according to content of the multimedia file, where the summary information is thumbnail content of the multimedia file.

The content of the multimedia file refers to the multimedia file itself, and the summary information of the multimedia file may be simplified information that can reflect the content of the multimedia file. In other words, a user may determine content of a multimedia file according to summary information of the multimedia file. For example: for a picture, the summary information may be a thumbnail of the picture; for a video, the summary information may be one or several frames of static pictures or a video clip; and for an audio, the summary information may be a climax part or a representative part of the audio, but the present disclosure is not limited thereto.

930: Add the summary information of the multimedia file to the label of the multimedia file.

In the prior art, a multimedia file includes at least a label and content. The label of the multimedia file is a description about information of the multimedia file, and mainly records attribute information of the multimedia file. For example: for a picture, the label includes resolution, photograph pixels, a size, and the like; and for a video, the label includes a date when the video is shot, a video size, and the like. In this embodiment according to the present disclosure, summary information of a multimedia file is added to a label of the multimedia file; no matter the multimedia file is stored locally or stored in another storage server that is connected by using a network, and no matter the multimedia file is encrypted or not, a user can intuitively and accurately determine content of the multimedia file by quickly viewing the label, and does not need to open or acquire the multimedia file. In addition, when the multimedia file is relatively large, compared with opening the multimedia file, locally opening the label of the multimedia file saves memory resources of a device. Furthermore, when the multimedia file is stored in a server that is connected by using a network, compared with downloading the multimedia file, downloading the label of the multimedia file also saves traffic.

Therefore, in the method for generating a label of a multimedia file according to this embodiment of the present disclosure, summary information of a multimedia file is generated according to content of the multimedia file, and the summary information of the multimedia file is added to a label of the multimedia file, so that the content of the multimedia file can be determined quickly by viewing the label of the multimedia file.

Figure 10:
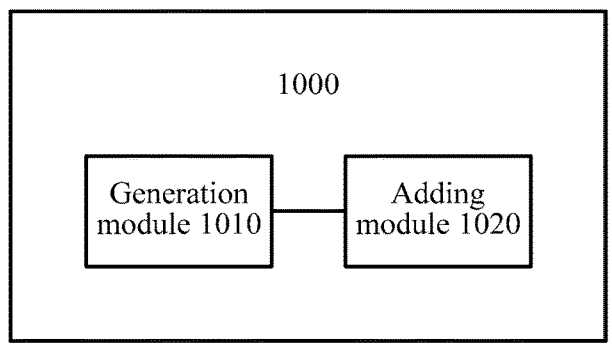
FIG. 10 is a schematic block diagram of an apparatus for generating a label of a multimedia file according to an embodiment of the present disclosure.

FIG. 10 shows a schematic block diagram of an apparatus 1000 for generating a label of a multimedia file according to an embodiment of the present disclosure. As shown in FIG. 10, the apparatus 1000 includes: a generating module 1010 and an adding module 1020.

The generating module 1010 is configured to generate a label of a multimedia file, and generate summary information of the multimedia file according to content of the multimedia file, where the summary information is thumbnail content of the multimedia file.

The adding module 1020 is configured to add the summary information of the multimedia file to the label of the multimedia file.

It should be understood that, the foregoing and other operations and/or functions of the modules in the apparatus 1000 for generating a label of a multimedia file according to this embodiment of the present disclosure are separately used for implementing corresponding processes of the method 900 in FIG. 9, and for the purpose of brevity, details are not described herein again.

Therefore, the apparatus for generating a label of a multimedia file according to this embodiment of the present disclosure generates summary information of a multimedia file according to content of the multimedia file, and adds the summary information of the multimedia file to a label of the multimedia file, so that the content of the multimedia file can be determined quickly by viewing the label of the multimedia file.

Figure 11:
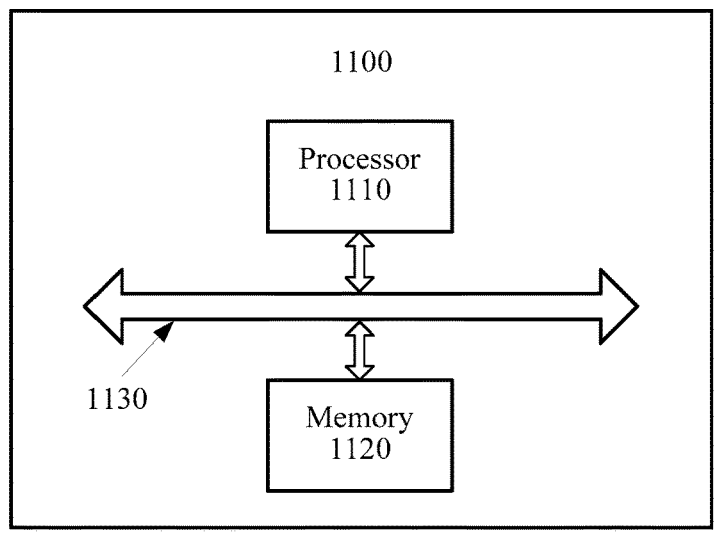
FIG. 11 is a schematic block diagram of an apparatus for generating a label of a multimedia file according to another embodiment of the present disclosure.

FIG. 11 shows a schematic block diagram of an apparatus 1100 for generating a label of a multimedia file according to another embodiment of the present disclosure. As shown in FIG. 11, the apparatus 1100 includes: a processor 1110, a memory 1120, and a bus system 1130. The processor 1110 and the memory 1120 are connected by using the bus system 1130, where the memory 1120 is configured to store an instruction, and the processor 1110 is configured to execute the instruction stored in the memory 1120.

The processor 1110 is configured to generate a label of a multimedia file, and generate summary information of the multimedia file according to content of the multimedia file, where the summary information is thumbnail content of the multimedia file; and is further configured to add the summary information of the multimedia file to the label of the multimedia file.

Therefore, the apparatus for generating a label of a multimedia file according to this embodiment of the present disclosure generates summary information of a multimedia file according to content of the multimedia file, and adds the summary information of the multimedia file to a label of the multimedia file, so that the content of the multimedia file can be determined quickly by viewing the label of the multimedia file.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A method for searching for a multimedia file, comprising:
   sending, by a terminal device to a server, a first request message, wherein the first request message is used to request encrypted summary information of a first multimedia file in at least one multimedia file;
   receiving, by the terminal device from the server, the encrypted summary information of the first multimedia file in the at least one multimedia file, wherein encrypted content of the at least one multimedia file and encrypted summary information of the at least one multimedia file are stored in the server, and the encrypted summary information of the at least one multimedia file corresponds to the encrypted content of the at least one multimedia file;
   sending, by the terminal device to the server, a second request message, wherein the second request message is used to request encrypted content of the first multimedia file corresponding to the encrypted summary information of the first multimedia file; and
   receiving, by the terminal device from the server, the encrypted content of the first multimedia file corresponding to the encrypted summary information of the first multimedia file;
   wherein the encrypted summary information of the first multimedia file is in a label of the first multimedia file, the label of the first multimedia file is a description about the first multimedia file, and before the receiving, by the terminal device from the server, the encrypted summary information of the first multimedia file in the at least one multimedia file, the method further comprises:
   acquiring, by the terminal device, an address, in the server, of the label of the first multimedia file, and an address, in the server, of the encrypted content of the first multimedia file corresponding to the label of the first multimedia file, wherein the first request message carries the address, in the server, of the label of the first multimedia file and is used to request the label of the first multimedia file;
   receiving, by the terminal device, the label, sent by the server, of the first multimedia file; and
   acquiring, by the terminal device, the encrypted summary information of the first multimedia file from the label of the first multimedia file, wherein the second request message carries the address, in the server, of the encrypted content of the first multimedia file corresponding to the label of the first multimedia file, and is used to request the encrypted content of the first multimedia file.

2. The method according to claim 1, wherein the address, in the server, of the label of the first multimedia file and the address, in the server, of the encrypted content of the first multimedia file are a same address or different addresses.

3. The method according to claim 1, further comprising:
generating, by the terminal device according to content of a second multimedia file in the at least one multimedia file, summary information of the second multimedia file;
encrypting, by the terminal device, the summary information of the second multimedia file by using a first key, to obtain encrypted summary information of the second multimedia file, and putting the encrypted summary information of the second multimedia file into a label of the second multimedia file;
encrypting, by the terminal device, the content of the second multimedia file by using a second key, to obtain encrypted content of the second multimedia file;
sending, by the terminal device, the label of the second multimedia file and the encrypted content of the second multimedia file to the server; and
receiving, by the terminal device, an address, in the server, of the label of the second multimedia file and an address, in the server, of the encrypted content of the second multimedia file that are returned by the server.

4. The method according to claim 3, wherein before the sending, by the terminal device, the label of the second multimedia file and the encrypted content of the second multimedia file to the server, the method further comprises:
receiving, by the terminal device, a personal digital certificate issued by a trusted third party (TTP); and
encrypting, by the terminal device, the first key and the second key by using a public key corresponding to the personal digital certificate, and putting an encrypted first key and an encrypted second key into the label of the second multimedia file,
wherein after receiving the label, sent by the server, of the second multimedia file, the terminal device decrypts, by using a private key corresponding to the public key, the encrypted first key and the encrypted second key that are in the label of the second multimedia file.

5. The method according to claim 3,
wherein the address, in the server, of the label of the second multimedia file and the address, in the server, of the encrypted content of the second multimedia file are different addresses; and
wherein before the sending, by the terminal device, the label of the second multimedia file and the encrypted content of the second multimedia file to the server, the method further comprises:
separating, by the terminal device, the label of the second multimedia file and the encrypted content of the second multimedia file, and
recording, by the terminal device, a correspondence between the label of the second multimedia file and the encrypted content of the second multimedia file.

6. The method according to claim 1, further comprising:
generating, by the terminal device according to content of a second multimedia file in the at least one multimedia file, summary information of the second multimedia file;
putting, by the terminal device, the summary information of the second multimedia file into a label of the second multimedia file, and encrypting the label of the second multimedia file by using a first key;
encrypting, by the terminal device, the content of the second multimedia file by using a second key, to obtain encrypted content of the second multimedia file;
sending, by the terminal device, the label, which has been encrypted, of the second multimedia file and the encrypted content of the second multimedia file to the server; and
receiving, by the terminal device, an address, in the server, of the label of the second multimedia file and an address, in the server, of the encrypted content of the second multimedia file that are returned by the server.

7. A method for searching for a multimedia file, comprising:
receiving, by a server, a first request message sent by a terminal device, wherein the first request message is used to request encrypted summary information of a first multimedia file in at least one multimedia file, wherein encrypted content of the at least one multimedia file and encrypted summary information of the at least one multimedia file are stored in the server, and the encrypted summary information of the at least one multimedia file corresponds to the encrypted content of the at least one multimedia file;
sending, by the server, the encrypted summary information of the first multimedia file to the terminal device according to the first request message;
receiving, by the server, a second request message sent by the terminal device, wherein the second request message is used to request encrypted content of the first multimedia file corresponding to the encrypted summary information of the first multimedia file; and
sending, by the server to the terminal device according to the second request message, the encrypted content of the first multimedia file corresponding to the encrypted summary information of the first multimedia file,
wherein the encrypted summary information of the first multimedia file is in a label of the first multimedia file, the label of the first multimedia file is a description about the first multimedia file, the first request message carries an address of the label of the first multimedia file and is used to request the label of the first multimedia file; and
wherein the sending, by the server, the encrypted summary information of the first multimedia file to the terminal device according to the first request message comprises:
sending, by the server, the label of the first multimedia file to the terminal device, wherein the second request message carries an address of the encrypted content of the first multimedia file, wherein the encrypted content of the first multimedia file corresponds to the label of the first multimedia file.

8. The method according to claim 7,
wherein the encrypted summary information of the first multimedia file is in a label of the first multimedia file, the label of the first multimedia file is a description about the first multimedia file, the first request message carries an address of the label of the first multimedia file and is used to request the label of the first multimedia file;
wherein after the receiving, by the server, the first request message sent by the terminal device, the method further comprises:
separating, by the server, the label of the first multimedia file and the encrypted content of the first multimedia file according to the first request message, and
recording, by the server, a correspondence between the label of the first multimedia file and the encrypted content of the first multimedia file;

wherein the sending, by the server, the encrypted summary information of the first multimedia file to the terminal device comprises: sending, by the server, the label of the first multimedia file to the terminal device, wherein the second request message carries the address of the label of the first multimedia file; and wherein after the receiving, by the server, a second request message sent by the terminal device, the method further comprises: determining, by the server according to the second request message and the correspondence, the encrypted content of the first multimedia file corresponding to the label of the first multimedia file.

9. A terminal device, comprising:

a memory storing instructions; and a processor configured to execute the instructions stored in the memory to cause the terminal device to:
- send, to a server, a first request message, wherein the first request message is used to request encrypted summary information of a first multimedia file in at least one multimedia file;
- receive, from the server, the encrypted summary information of the first multimedia file in the at least one multimedia file, wherein encrypted content of the at least one multimedia file and encrypted summary information of the at least one multimedia file are stored in the server, and the encrypted summary information of the at least one multimedia file corresponds to the encrypted content of the at least one multimedia file;
- send, to the server, a second request message, wherein the second request message is used to request encrypted content of the first multimedia file corresponding to the encrypted summary information of the first multimedia file;
- receive, from the server, the encrypted content of the first multimedia file corresponding to the encrypted summary information of the first multimedia file;
- generate, according to content of a second multimedia file in the at least one multimedia file, summary information of the second multimedia file;
- encrypt the summary information of the second multimedia file by using a first key, to obtain encrypted summary information of the second multimedia file, and put the encrypted summary information of the second multimedia file into a label of the second multimedia file; and further configured to encrypt content of the second multimedia file by using a second key, to obtain encrypted content of the second multimedia file;
- send the label of the second multimedia file and the encrypted content of the second multimedia file to the server; and
- receive an address, in the server, of the label of the second multimedia file and an address, in the server, of the encrypted content of the second multimedia file that are returned by the server.

10. The terminal device according to claim 9, wherein the encrypted summary information of the first multimedia file is in a label of the first multimedia file, the label of the first multimedia file is a description about a multimedia file of the first multimedia file, and wherein the processor is further configured to execute the instructions stored in the memory to cause the terminal device to:
- before receiving from the server, the encrypted summary information of the first multimedia file in the at least one multimedia file;
- acquire an address, in the server, of the label of the first multimedia file and an address, in the server, of the encrypted content of the first multimedia file corresponding to the label of the first multimedia file, wherein the first request message carries the address, in the server, of the label of the first multimedia file and is used to request the label of the first multimedia file;
- receive the label, sent by the server, of the first multimedia file; and
- acquire the encrypted summary information of the first multimedia file according to the label of the first multimedia file, wherein the second request message carries the address, in the server, of the encrypted content of the first multimedia file corresponding to the label of the first multimedia file, and is used to request the encrypted content of the first multimedia file.

11. The terminal device according to claim 9, wherein the processor is further configured to execute the instructions stored in the memory to cause the terminal device to:
- before sending the label of the second multimedia file and the encrypted content of the second multimedia file to the server, receive a personal digital certificate issued by a trusted third party (TTP);
- encrypt the first key and the second key by using a public key corresponding to the personal digital certificate, and put an encrypted first key and an encrypted second key into the label of the second multimedia file; and
- after receiving the label, sent by the server, of the second multimedia file, decrypt, by using a private key corresponding to the public key, the encrypted first key and the encrypted second key that are in the label of the second multimedia file.

12. The terminal device according to claim 9, wherein the processor is further configured to execute the instructions stored in the memory to cause the terminal device to:
- generate, according to content of a second multimedia file in the at least one multimedia file, summary information of the second multimedia file;
- put the summary information of the second multimedia file into a label of the second multimedia file and encrypt the label of the second multimedia file by using the first key; and further configured to encrypt content of the second multimedia file by using the second key, to obtain encrypted content of the second multimedia file;
- send the label, which has been encrypted, of the second multimedia file and the encrypted content of the second multimedia file to the server; and
- receive an address, in the server, of the label of the second multimedia file and an address, in the server, of the encrypted content of the second multimedia file that are returned by the server.

13. A server, comprising:

a memory storing instructions; and a processor configured to execute the instructions stored in the memory to cause the server to:
- receive a first request message sent by a terminal device, wherein the first request message is used to request encrypted summary information of a first multimedia file in at least one multimedia file, wherein encrypted content of the at least one multimedia file and encrypted summary information of the at least one multimedia file are stored in the server, and the encrypted summary information of the at least one multimedia file corresponds to the encrypted content of the at least one multimedia file; and send the encrypted summary information of the first multimedia file to the terminal device according to the first request message;

receive a second request message sent by the terminal device, wherein the second request message is used to request encrypted content of the first multimedia file corresponding to the encrypted summary information of the first multimedia file; and send, to the terminal device according to the second request message, the encrypted content of the first multimedia file corresponding to the encrypted summary information of the first multimedia file;

wherein the encrypted summary information of the first multimedia file is in a label of the first multimedia file, the label of the first multimedia file is a description about the first multimedia file, the first request message carries an address of the label of the first multimedia file and is used to request the label of the first multimedia file;

wherein after the receiving, by the server, the first request message sent by the terminal device, the method further comprises:
  separating, by the server, the label of the first multimedia file and the encrypted content of the first multimedia file according to the first request message, and
  recording, by the server, a correspondence between the label of the first multimedia file and the encrypted content of the first multimedia file;

wherein the sending, by the server, the encrypted summary information of the first multimedia file to the terminal device comprises: sending, by the server, the label of the first multimedia file to the terminal device, wherein the second request message carries the address of the label of the first multimedia file; and wherein after the receiving, by the server, a second request message sent by the terminal device, the method further comprises: determining, by the server according to the second request message and the correspondence, the encrypted content of the first multimedia file corresponding to the label of the first multimedia file.

14. A terminal device, comprising:
a memory;
a transceiver, configured to:
  send, to a server, a first request message, wherein the first request message is used to request encrypted summary information of a first multimedia file in at least one multimedia file;
  receive, from the server, the encrypted summary information of the first multimedia file in the at least one multimedia file, wherein encrypted content of the at least one multimedia file and encrypted summary information of the at least one multimedia file are stored in the server, and the encrypted summary information of the at least one multimedia file corresponds to the encrypted content of the at least one multimedia file;
  send, to the server, a second request message, wherein the second request message is used to request encrypted content of the first multimedia file corresponding to the encrypted summary information of the first multimedia file;
  receive, from the server, the encrypted content of the first multimedia file corresponding to the encrypted summary information of the first multimedia file;
  generate, according to content of a second multimedia file in the at least one multimedia file, summary information of the second multimedia file;
  put the summary information of the second multimedia file into a label of the second multimedia file and encrypt the label of the second multimedia file by using the first key; and further configured to encrypt content of the second multimedia file by using the second key, to obtain encrypted content of the second multimedia file;
  send the label, which has been encrypted, of the second multimedia file and the encrypted content of the second multimedia file to the server; and
  receive an address, in the server, of the label of the second multimedia file and an address, in the server, of the encrypted content of the second multimedia file that are returned by the server.

15. A server, comprising:
a transceiver, configured to:
  receive a first request message sent by a terminal device, wherein the first request message is used to request encrypted summary information of a first multimedia file in at least one multimedia file, wherein encrypted content of the at least one multimedia file and encrypted summary information of the at least one multimedia file are stored in the server, and the encrypted summary information of the at least one multimedia file corresponds to the encrypted content of the at least one multimedia file;
  send the encrypted summary information of the first multimedia file to the terminal device according to the first request message;
  receive a second request message sent by the terminal device, wherein the second request message is used to request encrypted content of the first multimedia file corresponding to the encrypted summary information of the first multimedia file; and
  send, to the terminal device according to the second request message, the encrypted content of the first multimedia file corresponding to the encrypted summary information of the first multimedia file;

wherein the encrypted summary information of the first multimedia file is in a label of the first multimedia file, the label of the first multimedia file is a description about the first multimedia file, the first request message carries an address of the label of the first multimedia file and is used to request the label of the first multimedia file; and wherein the sending, by the server, the encrypted summary information of the first multimedia file to the terminal device according to the first request message comprises:
  sending, by the server, the label of the first multimedia file to the terminal device, wherein the second request message carries an address of the encrypted content of the first multimedia file, wherein the encrypted content of the first multimedia file corresponds to the label of the first multimedia file.

16. The server according to claim 15,
wherein the encrypted summary information of the first multimedia file is in a label of the first multimedia file, the label of the first multimedia file is a description about the first multimedia file, the first request message carries an address of the label of the first multimedia file and is used to request the label of the first multimedia file;

wherein after the receiving, by the server, the first request message sent by the terminal device, the method further comprises:

separating, by the server, the label of the first multimedia file and the encrypted content of the first multimedia file according to the first request message, and recording, by the server, a correspondence between the label of the first multimedia file and the encrypted content of the first multimedia file;

wherein the sending, by the server, the encrypted summary information of the first multimedia file to the terminal device comprises: sending, by the server, the label of the first multimedia file to the terminal device, wherein the second request message carries the address of the label of the first multimedia file; and wherein after the receiving, by the server, a second request message sent by the terminal device, the method further comprises: determining, by the server according to the second request message and the correspondence, the encrypted content of the first multimedia file corresponding to the label of the first multimedia file.

* * * * *